United States Patent
Okamura et al.

(10) Patent No.: US 9,360,957 B2
(45) Date of Patent: Jun. 7, 2016

(54) SEMICONDUCTOR DEVICE

(71) Applicant: Synaptics Display Devices GK, Tokyo (JP)

(72) Inventors: Kazuhiro Okamura, Tokyo (JP); Shigeru Ota, Tokyo (JP)

(73) Assignee: Synaptics Display Devices GK, Tokyo (JP)

( * ) Notice: Subject to any disclaimer, the term of this patent is extended or adjusted under 35 U.S.C. 154(b) by 325 days.

(21) Appl. No.: 14/167,043

(22) Filed: Jan. 29, 2014

(65) Prior Publication Data

US 2014/0210751 A1     Jul. 31, 2014

(30) Foreign Application Priority Data

Jan. 30, 2013   (JP) .................. 2013-015238

(51) Int. Cl.
    *G06F 3/041*     (2006.01)
(52) U.S. Cl.
    CPC ............ *G06F 3/0412* (2013.01); *G06F 3/0416* (2013.01)
(58) Field of Classification Search
    CPC .......................... G06F 3/0412; G06F 3/0416
    See application file for complete search history.

(56) References Cited

U.S. PATENT DOCUMENTS

| 8,451,234 | B2 * | 5/2013 | Sato ................... G02F 1/13338 178/18.01 |
| 9,024,913 | B1 * | 5/2015 | Jung ....................... G06F 3/044 178/18.06 |
| 2009/0309858 | A1 * | 12/2009 | Jin ....................... G06F 3/0412 345/207 |
| 2010/0013791 | A1 * | 1/2010 | Haga .................... G06F 3/0412 345/174 |
| 2011/0043471 | A1 * | 2/2011 | Senda .................. G06F 3/0412 345/173 |
| 2011/0102360 | A1 * | 5/2011 | Chen .................... G06F 3/0412 345/173 |
| 2011/0141151 | A1 * | 6/2011 | Fujioka ................ G06F 1/3203 345/690 |
| 2011/0193820 | A1 * | 8/2011 | Chen .................... G06F 3/0412 345/174 |
| 2011/0254795 | A1 * | 10/2011 | Chen .................... G06F 3/0412 345/173 |
| 2012/0056835 | A1 | 3/2012 | Choo et al. |
| 2012/0098776 | A1 * | 4/2012 | Chen .................... G06F 3/0416 345/173 |
| 2012/0313913 | A1 * | 12/2012 | Shiraki ................ G06F 3/0412 345/207 |

(Continued)

FOREIGN PATENT DOCUMENTS

| JP | 2007-193923 A | 8/2007 |
| JP | 2008-032756 A | 2/2008 |

(Continued)

*Primary Examiner* — Tom Sheng
(74) *Attorney, Agent, or Firm* — Miles & Stockbridge P.C.

(57) ABSTRACT

A semiconductor device including a display driving circuit that drives a display panel, a touch detection signal driving circuit that applies a touch detection signal to a touch sensor, and a touch state detection circuit that receives a signal obtained by observing the touch sensor is configured as follows. A connection switching circuit that switches connection between a terminal and an internal circuit is included therein. The connection switching circuit switches connection with the terminal by selecting one of at least two of the display driving circuit, the touch detection signal driving circuit and the touch state detection circuit. A protection circuit which is capable of changing a protection voltage level is connected to the terminal, and the protection voltage level varies depending on the signal amplitude of the circuit selected by the connection switching circuit.

15 Claims, 22 Drawing Sheets

(56) References Cited

U.S. PATENT DOCUMENTS

| | | | |
|---|---|---|---|
| 2013/0076647 A1* | 3/2013 | Yousefpor | G06F 3/0412 345/173 |
| 2013/0093706 A1* | 4/2013 | Kurasawa | G06F 3/0412 345/173 |
| 2013/0187887 A1* | 7/2013 | Mizuhashi | G06F 3/044 345/174 |
| 2013/0249825 A1* | 9/2013 | Kang | G06F 3/03547 345/173 |
| 2014/0204049 A1* | 7/2014 | Tsai | G06F 3/0412 345/174 |
| 2015/0205429 A1* | 7/2015 | Nie | G06F 3/0416 345/175 |

FOREIGN PATENT DOCUMENTS

| | | |
|---|---|---|
| JP | 2012-059265 A | 3/2012 |
| JP | 2012-234475 A | 11/2012 |

* cited by examiner (TOP VIEW)

(X-Y CROSS-SECTIONAL VIEW)

(TOP VIEW)

( X-Y CROSS-SECTIONAL VIEW )

(TOP VIEW)

( X-Y CROSS-SECTIONAL VIEW )

(TOP VIEW)

(X-Y CROSS-SECTIONAL VIEW)

(TOP VIEW)

( X-Y CROSS-SECTIONAL VIEW )

(TOP VIEW)

( X-Y CROSS-SECTIONAL VIEW )

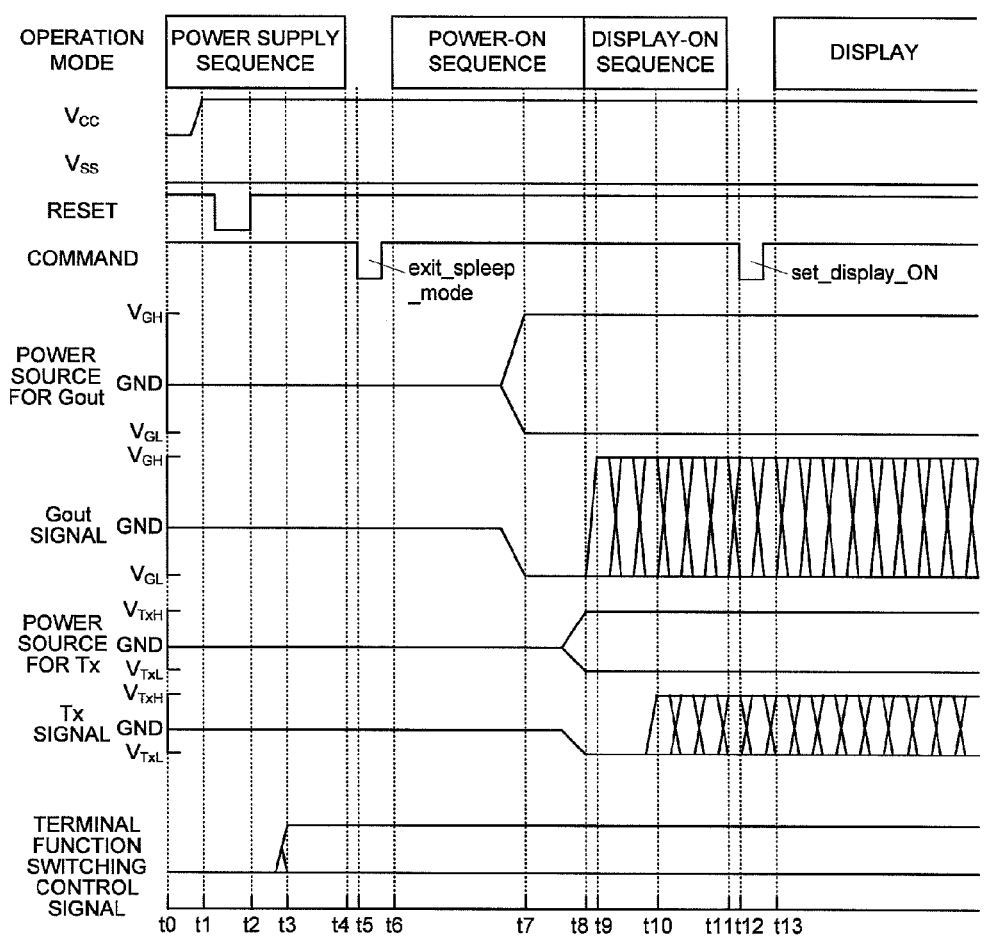

SEMICONDUCTOR DEVICE

CROSS-REFERENCE TO RELATED APPLICATIONS

The Present application claims priority from Japanese application JP 2013-015238 filed on Jan. 30, 2013, the content of which is hereby incorporated by reference into this application.

BACKGROUND

The present invention relates to a driver LSI (Large Scale Integrated circuit) of a display panel including a touch sensor, and particularly relates to a technique which is capable of being used suitably for providing a driver LSI connectable to various types of display panels.

Hitherto, on-cell types in which a display panel and a touch panel are independent of each other have been the mainstream. However, in recent years, in-cell types capable of achieving a further reduction in thickness in which a display panel and a touch panel are integrated with each other have been widespread, particularly, in mobile panel modules. For example, JP-A-2008-32756 discloses a touch panel display device in which a liquid crystal layer, a transparent electrode for display, a transparent electrode for detecting a touched position and a color filter are integrally provided between a plurality of laminated glass substrates, and which detects the touched position using an electrostatic capacitance coupling type and displays an image.

In an in-cell type, a display driver and a touch controller are connected to a display panel including a touch sensor, and image data which is input from a host processor is displayed, and a touched position is detected and is output to the host processor. JP-A-2012-59265 discloses a display device having a touch sensor and a driving method therefor which are capable of reducing an influence of noise by performing time division on a region for touch sensing and display and alternately driving the region. JP-A-2012-234475 discloses an electrode driving circuit for touch sensing of a touch sensor panel which is not limited to an in-cell type. In a driving circuit that outputs a signal for detection to a touch sensor, a switch circuit that selects a necessary driving voltage from a plurality of driving voltages is included in order to mitigate the influence of noise caused by the rise and fall of the signal, and switch control of the switch circuit is performed depending on waveform modes. In addition, it is disclosed that the circuit may be formed in a single chip including a display driver or a microprocessor.

On the other hand, in case that a SIP (System In Package) is formed together with another semiconductor device, JP-A-2007-193923 discloses a semiconductor device which is capable of performing the adjustment of a terminal between the semiconductor device and another semiconductor device without replacing the position of the terminal by changing a layout, and capable of increasing the development efficiency of the SIP. It is possible to perform the adjustment of the terminal between the semiconductor device and another semiconductor device by providing a transmission line switching circuit between an internal circuit and the terminal.

SUMMARY

The inventor has examined JP-A-2008-32756, JP-A-2012-59265, JP-A-2012-234475 and JP-A-2007-193923, and has found that there is the following new problem.

In the in-cell type as disclosed in JP-A-2008-32756, there are various forms in a display panel including a touch sensor, and the arrangement of a terminal that supplies a signal for driving the display panel, a terminal that applies a signal for detection to the touch sensor, and a terminal that detects a signal for performing touch detection such as, for example, a change in capacity varies with the variety of display panels. In case that a display driver and a touch controller are respectively formed in separate semiconductor chips, there is a degree of freedom allowing adaptation for various terminal arrangements of the display panel, to some extent, by a method of optimizing the arrangement of the semiconductor chips on a mounting substrate. However, in case that the display driver and the touch controller are formed in a single chip, the degree of freedom is extremely restricted.

In the technique disclosed in JP-A-2007-193923, the adjustment of the terminal between the semiconductor device and another semiconductor device is performed by providing the transmission line switching circuit between the internal circuit and the terminal. An internal signal having a different logical function can be selectively connected to a specific terminal. The inventors have examined whether a function of a specific terminal can be switched between three kinds of inputs and outputs of an output of a signal for driving a display panel, an output of a signal for detection to a touch sensor, and an input of a signal for touch detection, with respect to terminals of a semiconductor device in which a display driver and a touch controller are formed in a single chip using this technique.

The display driver and the touch controller also perform analog processing of adapting a current and a voltage of a signal to the display panel and the touch sensor which are loads, in addition to digital signal processing such as timing control. A signal for driving a gate driver of a liquid crystal display panel has, for example, an amplitude of +15 V to −12 V, but a detection signal for touch sensing may have an amplitude of +3 V to −2 V. Further, as disclosed in JP-A-2012-234475, driving may be performed by selecting a necessary driving voltage from a plurality of driving voltages.

In the technique disclosed in JP-A-2007-193923, an internal signal having a different logical function can be selectively connected to a specific terminal, whereas analog processing of adapting a current and a voltage of a signal to the display panel and the touch sensor which are loads cannot be performed. Further, no consideration is given to a protection circuit in case that an over-voltage is applied to a terminal.

Means for solving such a problem will be described below, but other problems and novel features of the present invention will be made clearer from the description and the accompanying drawings of this specification.

According to an embodiment, a configuration is as follows.

That is, a semiconductor device including a display driving circuit, capable of being connected to a display panel including a touch sensor, which drives a display panel, a touch detection signal driving circuit that applies a touch detection signal to a touch sensor, and a touch state detection circuit that receives a signal obtained by observing the touch sensor is configured as follows.

A connection switching circuit that switches connection between a terminal and an internal circuit is included therein. The connection switching circuit switches connection with the terminal by selecting one of at least two of the display driving circuit, the touch detection signal driving circuit and the touch state detection circuit.

A protection circuit which is capable of changing a protection voltage level is connected to the terminal, and the protection voltage level varies depending on the signal amplitude of the circuit selected by the connection switching circuit.

A brief description of an effect obtained by the embodiment is as follows.

That is, it is possible to allocate a function to any terminal in conformity with various forms of a display panel including a touch sensor, and to improve the degree of freedom of the routing of wiring to the display panel and a touch panel.

BRIEF DESCRIPTION OF THE DRAWINGS

FIG. 15 is a timing diagram illustrating a boot-up sequence of the semiconductor device according to the first embodiment.

DETAILED DESCRIPTION

1. Summary of the Embodiments

Figure 1:
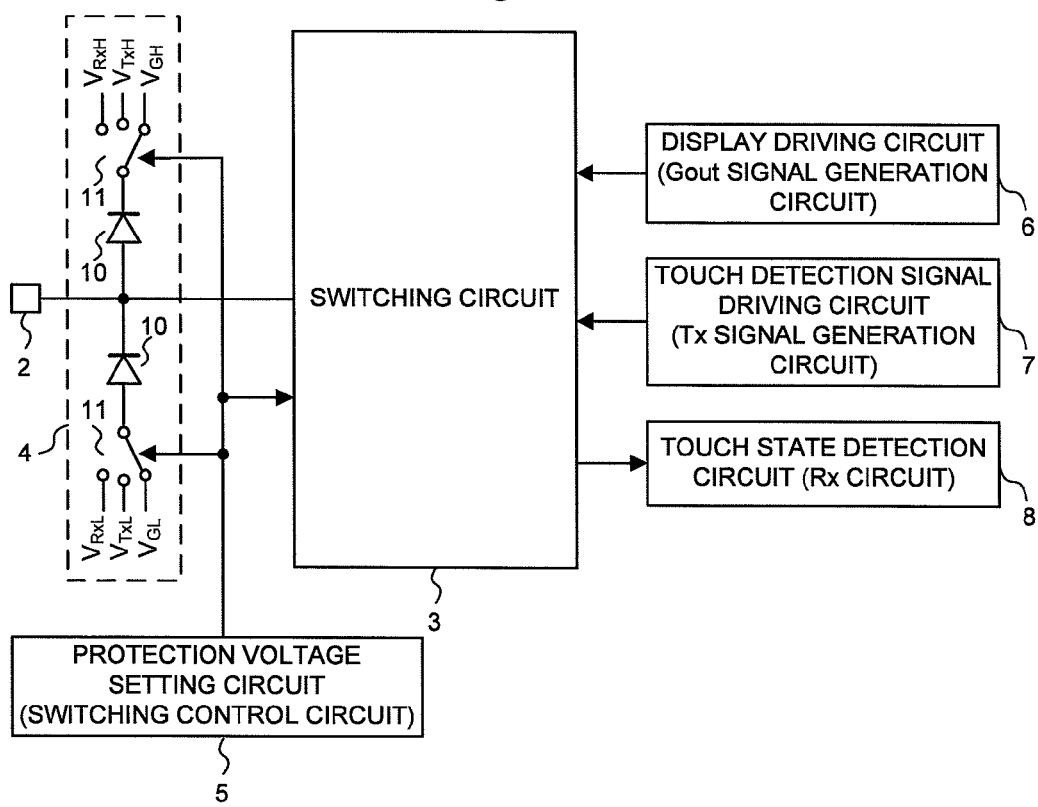
FIG. 1 is a block diagram illustrating main components of a semiconductor device according to a typical embodiment.

First, the summary of a typical embodiment disclosed in the present application will be described. Reference numerals and signs in the drawings that are referred to with parentheses applied thereto in the description of the summary of the typical embodiments are merely illustrative of what are included in the concepts of components marked with the reference numerals and signs.

[1] Display Driver Corresponding to Touch Panel Including Terminal Function Switching Circuit A semiconductor device (1) which is capable of being connected to a display panel (21) including a touch sensor (22) is configured as follows.

The semiconductor device includes a terminal (2), a display driving circuit (6) that drives the display panel, a touch detection signal driving circuit (7) that applies a touch detection signal to the touch sensor, a touch state detection circuit (8) that receives a signal obtained by observing the touch sensor, a connection switching circuit (3), a protection circuit (4), connected to the terminal, which is capable of changing a protection voltage level, and a protection voltage setting circuit (5) which is capable of performing control for changing the protection voltage level.

The connection switching circuit can switch connection with the terminal by selecting one of at least two of the display driving circuit, the touch detection signal driving circuit and the touch state detection circuit. The protection voltage setting circuit can set the protection voltage level of the protection circuit in accordance with a signal amplitude of the circuit selected by the connection switching circuit.

Thereby, it is possible to provide a display driver corresponding to a touch panel which is capable of allocating a function to any terminal arrangement in conformity with various forms of the display panel including the touch sensor. It is possible to improve the degree of freedom of the routing of wiring to the display panel and the touch panel. In addition, the protection voltage of the terminal is selectively switched in accordance with a function allocated to the terminal.

[2] Level Shift Circuit Capable of Setting Converted Voltage Level

In paragraph [1], the connection switching circuit includes a level shift circuit (9) which is capable of setting a converted voltage level, and the level shift circuit can set the converted voltage level in accordance with the signal amplitude to be output by the display driving circuit or the touch detection signal driving circuit which is selected by the connection switching circuit.

Thereby, it is possible to provide a display driver corresponding to a touch panel which is capable of allocating a function to any terminal arrangement in conformity with various forms of the display panel including the touch sensor. It is possible to improve the degree of freedom of the routing of wiring to the display panel and the touch panel. In addition, the output voltage of the terminal is selectively switched in accordance with a function allocated to the terminal.

[3] DCDC Conversion Circuit

In paragraph [2], the semiconductor device further includes a power supply circuit (26).

The power supply circuit is a circuit which is capable of generating a first power source ($V_{GH}/V_{GL}$) based on the signal amplitude to be output by the display driving circuit and a second power source ($V_{TxH/TxL}$) based on the signal amplitude to be output by the touch detection signal driving circuit, from a power source (Vcc) supplied from the outside.

The first power source and the second power source are supplied to the protection voltage setting circuit and the level shift circuit.

The protection voltage setting circuit is configured to be capable of setting the protection voltage level of the protection circuit by selecting any power source from power sources including the first power source and the second power source, in accordance with the signal amplitude of the circuit selected by the connection switching circuit.

The level shift circuit is configured to be capable of setting the converted voltage level by selecting any power source from power sources including the first power source and the second power source, in accordance with the signal amplitude to be output by the display driving circuit or the touch detection signal driving circuit which is selected by the connection switching circuit.

Thereby, it is possible to supply a required power source in an on-chip.

[4] Power-on Reset Circuit

In paragraph [3], the semiconductor device further includes a reset circuit (27) that outputs an internal reset signal by detecting that a voltage of the power source supplied from the outside exceeds a predetermined potential level.

The semiconductor device is configured such that, after the reset circuit outputs the reset signal, a connection switching operation by the connection switching circuit is performed, a setting operation of the protection voltage level by the protection voltage setting circuit is performed, a setting operation of the converted voltage level is performed, and then supply of the first power source and the second power source by the power supply circuit is started.

Thereby, power sources are supplied in an appropriate sequence within a chip, and thus it is possible to prevent a problem such as the flow of an excessive over-current from occurring.

[5] MPU

In paragraph [4], the semiconductor device further includes a MPU (25) to which the reset signal is input from the reset circuit, and which is capable of controlling the connection switching operation by the connection switching circuit, the setting operation of the protection voltage level by the protection voltage setting circuit, the setting operation of the converted voltage level, and the start of supply of the first power source and the second power source by the power supply circuit.

In case that the reset signal is input, the MPU executes a boot program, to thereby perform the connection switching operation by the connection switching circuit, perform the setting operation of the protection voltage level by the protection voltage setting circuit, perform the setting operation of the converted voltage level, and then start the supply of the first power source and the second power source by the power supply circuit.

Thereby, a process of selecting a terminal function and a process of generating a power source required therefor can be executed by a boot-up sequence of the MPU.

[6] Liquid Crystal Display Driver Corresponding to Touch Panel Including GIP/Tx Terminal Switching Circuits A semiconductor device (1) is configured as follows, which is capable of being connected to a liquid crystal display panel (21) including a touch sensor (22) to which a touch detection signal (17) is input and which outputs a touch sensing signal (16), and including a display panel source terminal group (14) to which a voltage to be applied to a liquid crystal is input and a display panel gate terminal group (15) to which a signal for specifying a position of the liquid crystal to be supplied with the voltage is input.

The semiconductor device includes a host interface terminal group (2_5), a source output terminal group (2_1) that outputs a signal for driving the display panel source terminal group, and a first terminal group (GIP terminal 2_2/Tx terminal 2_4 switching terminal). Further, the semiconductor device includes a display panel driving circuit (23) that drives the display panel source terminal group and the display panel gate terminal group on the basis of display data which is input from the host interface terminal group, and a touch detection signal driving circuit (7) that transmits the touch detection signal. In addition, the semiconductor device includes a first connection switching circuit (3), a first protection circuit (4), connected to the first terminal group, which is capable of changing a first protection voltage level, and a protection voltage setting circuit (5) which is capable of performing control for changing the first protection voltage level.

The first connection switching circuit includes a level shift circuit (9) which is capable of setting a converted voltage level, and is connected to the first terminal group by converting a signal amplitude level by the level shift circuit in which the converted voltage level is set, in accordance with a signal amplitude to be output by any one selected out of a circuit that outputs a signal for driving the display panel gate terminal group of the display panel driving circuit and the touch detection signal driving circuit. The protection voltage setting circuit sets the first protection voltage level in accordance with the signal amplitude of the circuit selected by the first connection switching circuit.

Thereby, it is possible to provide a liquid crystal display driver corresponding to a touch panel which is capable of appropriately allocating the terminal arrangement of the output terminal (GIP terminal 2_2) of the signal for driving the display panel gate terminal group and the terminal (Tx terminal 2_4) for transmitting the touch detection signal, in conformity with various forms of the display panel including the touch sensor. It is possible to improve the degree of freedom of the routing of wiring to the liquid crystal display panel and the touch panel. In addition, the protection voltage of the terminal can be selectively switched in accordance with a function allocated to the terminal.

[7] GIP/Tx Switching Terminal is Disposed on Lateral Face of the Side of Source Output Terminal In paragraph [6], the first terminal group (GIP/Tx switching terminal) is disposed further outside than the source output terminal group, on the same side as a side where the source output terminal group is disposed.

Thereby, it is possible to appropriately allocate the terminal arrangement of the output terminal (GIP terminal 2_2) of the signal for driving the display panel gate terminal group and the terminal (Tx terminal 2_4) for transmitting the touch detection signal, in conformity with various forms of the display panel including the touch sensor, and to route the wiring for the signal for driving the display panel gate terminal group and the touch detection signal to the touch panel without intersecting the wiring for the source driving signal to the liquid crystal display panel.

[8] GIP/Tx Switching Terminals are Disposed Closer to the End by Input Side and Output Side In paragraph [6], the first terminal group is disposed further outside than the source output terminal group located on the same side as a side where the source output terminal group is disposed, and is disposed further outside than the host interface terminal group located on an opposite side of the side where the source output terminal group is disposed and on the same side as a side where the host interface terminal group is disposed.

Thereby, it is possible to appropriately allocate the terminal arrangement of the output terminal (GIP terminal 2_2) of the signal for driving the display panel gate terminal group and the terminal (Tx terminal 2_4) for transmitting the touch detection signal, in conformity with various forms of the display panel including the touch sensor, and to route the wiring for the signal for driving the display panel gate terminal group and the touch detection signal to the touch panel without intersecting the wiring for the source driving signal to the liquid crystal display panel.

[9] GIP/Tx Terminal Switching Circuit+GIP/Tx/Rx Terminal Switching Circuit

In paragraph [6], the semiconductor device further includes a second terminal group (GIP/Tx/Rx switching terminals), a touch state detection circuit (8) that receives the touch sensing signal, a second connection switching circuit (3), and a second protection circuit (4), connected to the second terminal group, which is capable of changing a second protection voltage level.

The second connection switching circuit can switch connection with the second terminal group by selecting one of a circuit that outputs a signal for driving the display panel gate terminal group of the display panel driving circuit, the touch detection signal driving circuit and the touch state detection circuit. The protection voltage setting circuit is configured to be capable of setting the second protection voltage level in accordance with a signal amplitude of the circuit selected by the second connection switching circuit.

Thereby, it is possible to appropriately allocate the terminal arrangement of the output terminal (GIP terminal 2_2) of the signal for driving the display panel gate terminal group, the terminal (Tx terminal 2_4) for transmitting the touch detection signal, and a terminal (Rx terminal 2_3) for receiving a touch state detection signal, in conformity with various forms of the display panel including the touch sensor. It is possible to improve the degree of freedom of the routing of wiring to the liquid crystal display driver corresponding to the touch panel, the liquid crystal display panel and the touch panel. In addition, the protection voltage of the terminal can be selectively switched in accordance with a function allocated to the terminal.

[10] GIP/Tx Switching Terminals and GIP/Tx/Rx Switching Terminals on Source Output Terminal Side In paragraph [9], the first terminal group (GIP/Tx switching terminals) is disposed further outside than the source output terminal group, on the same side as a side where the source output terminal group is disposed, and the second terminal group (GIP/Tx/Rx switching terminals) is disposed further outside than the source output terminal group and further inside than the first terminal group, on the same side as the side where the source output terminal group is disposed.

Thereby, the wiring for the touch state detection signal is easily connected to wiring on TFT glass located on the source output terminal side, and can be routed without intersecting the wiring for the source driving signal to the liquid crystal display panel.

[11] GIP/Tx Switching Terminals on Both Sides and GIP/Tx/Rx Switching Terminals on Host Interface Terminal Side In paragraph [9], the first terminal group (GIP/Tx switching terminals) is disposed further outside than the source output terminal group located on the same side as a side where the source output terminal group is disposed, and is disposed further outside than the host interface terminal group located on an opposite side of the side where the source output terminal group is disposed and on the same side as a side where the host interface terminal group is disposed.

The second terminal group (GIP/Tx/Rx switching terminals) is disposed further outside than the host interface terminal group located on an opposite side of the side where the source output terminal group is disposed and on the same side as the side where the host interface terminal group is disposed.

Thereby, the wiring for the touch state detection signal is easily connected to a FPC on the host interface terminal side, and thus it is possible to facilitate the routing of wiring to the display panel with a touch sensor which includes a touch sensing signal detection electrode (46) on color filter glass or on the backside of cover glass.

[12] GIP/Tx Switching Terminals and GIP/Tx/Rx Switching Terminals on Both Sides

In paragraph [9], the first terminal group (GIP/Tx switching terminal) is disposed further outside than the source output terminal group located on the same side as a side where the source output terminal group is disposed, and is disposed further outside than the host interface terminal group located on an opposite side of the side where the source output terminal group is disposed and on the same side as a side where the host interface terminal group is disposed.

The second terminal group (GIP/Tx/Rx switching terminals) is disposed further outside than the source output terminal group and further inside than the first terminal group located on the same side as a side where the source output terminal group is disposed, and is disposed further outside than the host interface terminal group and further inside than the first terminal group located on an opposite side of the side where the source output terminal group is disposed and on the same side as the side where the host interface terminal group is disposed.

Thereby, even in case that the wiring for the touch state detection signal is connected to the display panel with a touch sensor which is suitable for wiring from the source output terminal side, and the wiring for the touch state detection signal is connected to the display panel with a touch sensor which is suitable for wiring from the host interface terminal side, it is possible to optimally switch a terminal function, and to improve the degree of freedom of the routing of wiring.

[13] DCDC Conversion Circuit

In paragraph [6], the semiconductor device further includes a power supply circuit (26).

The power supply circuit is a circuit which is capable of generating a first power source ($V_{GH}/V_{GL}$) based on the signal amplitude to be output by the display driving circuit and a second power source ($V_{TxH}/V_{TxL}$) based on the signal amplitude to be output by the touch detection signal driving circuit, from a power source (Vcc) supplied from the outside.

The first power source and the second power source are supplied to the protection voltage setting circuit and the level shift circuit.

The protection voltage setting circuit is configured to be capable of setting the protection voltage level of the protection circuit by selecting any power source from power sources including the first power source and the second power source, in accordance with the signal amplitude of the circuit selected by the connection switching circuit.

The level shift circuit is configured to be capable of setting the converted voltage level by selecting any power source from power sources including the first power source and the second power source, in accordance with the signal amplitude to be output by the display driving circuit or the touch detection signal driving circuit which is selected by the connection switching circuit.

Thereby, it is possible to supply a required power source in an on-chip.

[14] Power-on Reset Circuit

In paragraph [13], the semiconductor device further includes a reset circuit (27) that outputs an internal reset signal by detecting that a voltage of the power source supplied from the outside exceeds a predetermined potential level.

The semiconductor device is configured such that, after the reset circuit outputs the reset signal, a connection switching operation by the connection switching circuit is performed, a setting operation of the protection voltage level by the protection voltage setting circuit is performed, a setting operation of the converted voltage level is performed, and then supply of the first power source and the second power source by the power supply circuit is started.

Thereby, power sources are supplied in an appropriate sequence within a chip, and thus it is possible to prevent a problem such as the flow of an excessive over-current from occurring.

[15] MPU

In paragraph [14], the semiconductor device further includes an MPU (25) to which the reset signal is input from the reset circuit, and which is capable of controlling the connection switching operation by the connection switching circuit, the setting operation of a protection voltage level by the protection voltage setting circuit, the setting operation of the converted voltage level, and the start of supply of the first power source and the second power source by the power supply circuit.

In case that the reset signal is input, the MPU executes a boot program, to thereby perform the connection switching operation by the connection switching circuit, perform the setting operation of the protection voltage level by the protection voltage setting circuit, perform the setting operation of the converted voltage level, and then start the supply of the first power source and the second power source by the power supply circuit.

Thereby, a process of selecting a terminal function and a process of generating a power source required therefor can be executed by a boot-up sequence of the MPU.

2. Further Detailed Description of the Embodiments

The embodiments will be further described in detail.

Typical Embodiment

Figure 2:
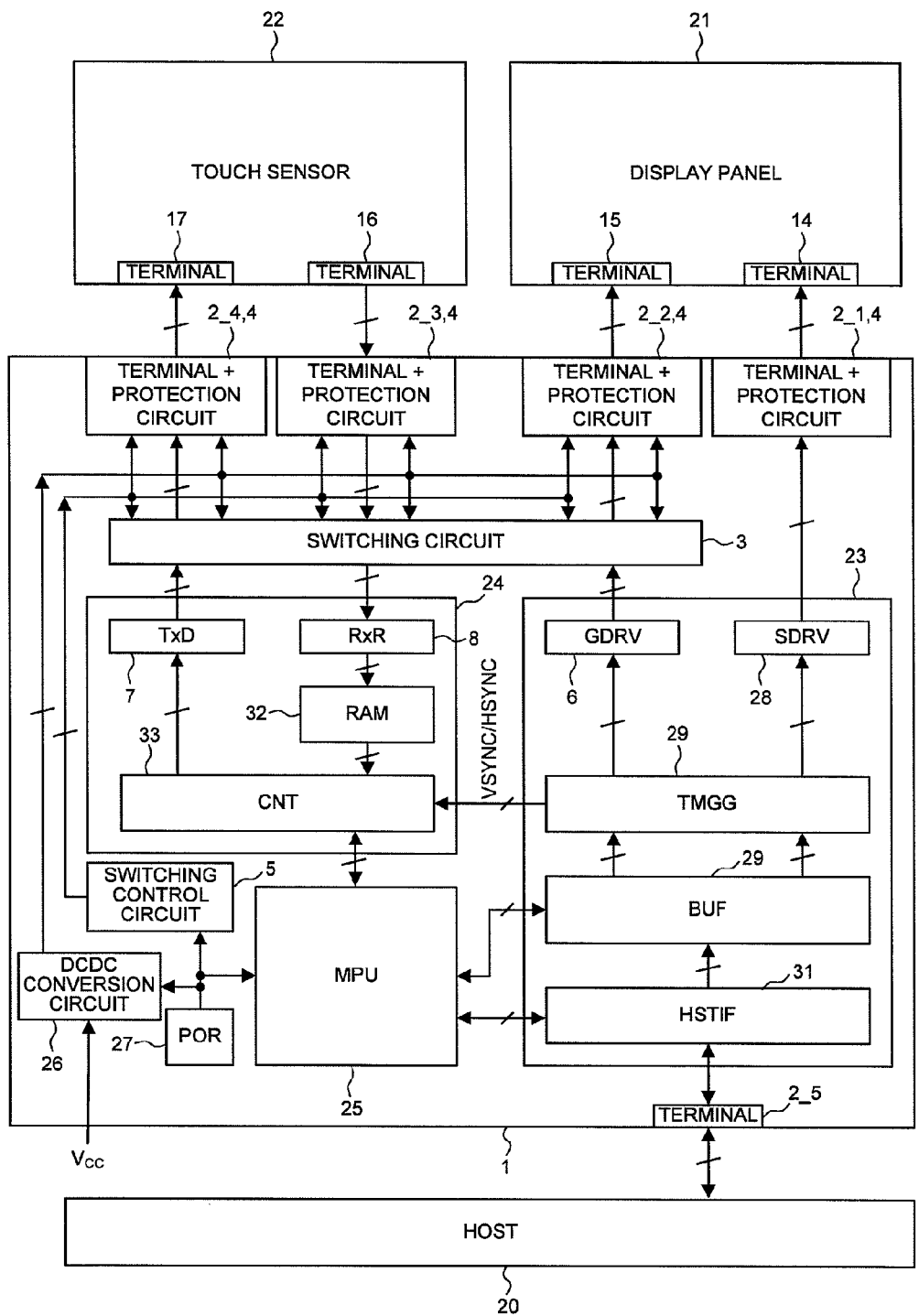
FIG. 2 is a block diagram illustrating a configuration example of the semiconductor device according to the embodiment of the present invention and a configuration of a display panel with a touch sensor having the semiconductor device mounted thereto.

FIG. 1 is a block diagram illustrating main components of a semiconductor device according to a typical embodiment, and FIG. 2 is a block diagram illustrating a configuration example of a semiconductor device according to an embodiment of the present invention and a configuration of a display panel with a touch sensor having the semiconductor device mounted thereto.

As shown in FIG. 2, a semiconductor device 1 according to the typical embodiment of the present invention is the semiconductor device 1 connected to a host processor 20 and a display panel 21 including a touch sensor 22, and is configured as follows as shown in FIG. 1. Although not particularly limited, the semiconductor device 1 is formed on a single silicon substrate using, for example, a known manufacturing technique of a CMOS (Complementary Metal-Oxide-Semiconductor field effect transistor) LSI (Large Scale Integrated circuit). FIG. 2 will be described in detail in paragraphs of a first embodiment.

The semiconductor device 1 includes a terminal 2, a display driving circuit 6 that drives the display panel 21, a touch detection signal driving circuit 7 that applies a touch detection signal to the touch sensor 22, a touch state detection circuit 8 that receives a signal obtained by observing the touch sensor 22, a connection switching circuit 3, a protection circuit 4 which is capable of changing a protection voltage level connected to the terminal 2, and a protection voltage setting circuit 5 that sets the protection voltage level. The display driving circuit 6 is, for example, a gate driver of a liquid crystal display panel, or a circuit that generates a signal that drives a GIP (Gate In Panel) terminal. The display driving circuit may be a liquid crystal display panel made of amorphous silicon, and may be a liquid crystal display panel made of low temperature poly-silicon (LTPS). Further, the display driving circuit 6 may be a circuit that generates a signal for driving an organic electroluminescence display (OLED) panel or other display panels.

The connection switching circuit 3 can switch connection with the terminal 2 by selecting one of at least two of the display driving circuit 6, the touch detection signal driving circuit 7 and the touch state detection circuit 8. The protection voltage setting circuit 5 sets the protection voltage level of the protection circuit 4 in accordance with the signal amplitude of the circuit selected by the connection switching circuit 3.

The protection circuit 4 which is capable of changing the protection voltage level can be constituted by, for example, switches 11 connected in series to diodes 10 connected to signal wiring which is connected to the terminal 2. $V_{GH}$ and $V_{GL}$ are highest and lowest voltage levels, respectively, of the amplitude of a signal which is output by the display driving circuit 6, and $V_{TxH}$ and $V_{TxL}$ are highest and lowest voltage levels, respectively, of the amplitude of a touch detection signal which is output by the touch detection signal driving circuit 7. $V_{RxH}$ and $V_{RxL}$ are highest and lowest voltage levels, respectively, of the amplitude of a signal allowed to be received by the touch state detection circuit 8, and are normally power supply voltage levels of the high potential side and the low potential side of the touch state detection circuit 8. The diode 10 on the high potential side is configured such that an anode is connected to wiring with the terminal 2, and a cathode is connected to the switch 11 side. In case that a voltage level exceeding a voltage applied through the switch 11 is applied to the terminal 2, the diode protects an internal circuit by releasing a current from the terminal 2 toward a power source. The diode 10 on the low potential side is configured such that a cathode is connected to wiring with the terminal 2, and an anode is connected to the switch 11 side. In case that a voltage level falling below a voltage applied through the switch 11 is applied to the terminal 2, the diode protects an internal circuit by releasing a negative current from the terminal 2 toward a power source.

The protection voltage level is set in accordance with the signal amplitude of the circuit selected by the connection switching circuit 3. In case that the connection switching circuit 3 allocates the terminal 2 to the display driving circuit 6, $V_{GH}$ and $V_{GL}$ are applied to the protection circuit 4. In case that a signal having an amplitude exceeding this range is applied, the internal circuit is protected. In case that the connection switching circuit 3 allocates the terminal 2 to the touch detection signal driving circuit 7, $V_{TxH}$ and $V_{TxL}$ are applied to the protection circuit 4. In case that a signal having an amplitude exceeding this range is applied, the internal circuit is protected. In case that the connection switching circuit 3 allocates the terminal 2 to the touch state detection circuit 8, $V_{RxH}$ and $V_{RxL}$ are applied to the protection circuit 4. In case that a signal having an amplitude exceeding this range is applied, the internal circuit is protected.

The protection voltage setting circuit 5 is realized as a function of a portion of the switching control circuit 5 for setting the protection voltage level, as mentioned above, in conjunction with the connection switching circuit 3. The switching control circuit 5 may be realized by a dedicated circuit and may be realized as a function controlled by software of the MPU or the like.

Thereby, it is possible to provide a display driver corresponding to a touch panel which is capable of allocating a function to any terminal arrangement in conformity with various forms of the display panel including the touch sensor.

It is possible to improve the degree of freedom of the routing of wiring to the display panel and the touch panel. In addition, the protection voltage of the terminal is selectively switched in accordance with a function allocated to the terminal.

First Embodiment

A More detailed embodiment will be described below. First, FIG. 2 will be described in detail. FIG. 2 is a block diagram illustrating a configuration example of the semiconductor device according to the embodiment of the present invention and a configuration of a display panel with a touch sensor having the semiconductor device mounted thereto.

The display panel 21 is, for example, a liquid crystal display panel, and includes a display panel source terminal group 14 to which a voltage to be applied to a liquid crystal is input, and a display panel gate terminal group 15 to which a signal for specifying a position of the liquid crystal to be supplied with the voltage is input. The number of source terminal groups 14 corresponds to the number of pixels of the display panel 21 in a line direction, is proportional to the panel size or resolution, and may be usually several thousands. A signal for specifying the position (line) of the liquid crystal to which a voltage input to the source terminal is to be applied is input to the display panel gate terminal group 15.

A touch detection signal 17 is input to the touch sensor 22, and a touch sensing signal 16 for detecting a capacitance value of electrostatic capacitance, for example, changing depending on a touch state is output therefrom.

In the semiconductor device 1, image data which is input from the host (HOST) 20 is changed to a predetermined signal form (amplitude, waveform, or timing), and is displayed by an output thereof to the source terminal group 14 and the gate terminal group 15 of the display panel 21. The semiconductor device is configured such that the touch detection signal 17 is input to the touch sensor 22 simultaneously or in a time-division manner, electrical characteristics changing depending on a touch state are detected by the touch sensing signal 16, and information such as a touch position is transmitted from the host 20, or is capable of being read out from the host 20. The display panel 21 and the touch sensor 22 are integrally formed, for example, by an in-cell type, and the source terminal group 14 and the gate terminal group 15 of the display panel 21, and the arrangement of terminals for the touch sensing signal 16 and the touch detection signal 17 are of great variety. For this reason, in case that the arrangement of signal input and output terminals which are connected to these terminals is fixed, the semiconductor device 1 does not have an optimal layout in its entirety. Therefore, in case that the combination thereof is not suitable, the routing of wiring becomes longer. The complication of wiring causes negative effects such as an increase in the substrate area and an increase in noise.

The semiconductor device 1 is configured to include a display panel driving circuit 23 that generates a signal for driving the display panel 21, a touch control circuit 24 that generates the touch detection signal 17 and receives the touch sensing signal 16, and an MPU 25 that controls the entirety of the device. The display panel driving circuit 23 is configured to include a host interface (HSTIF) 31, a buffer (BUF) 31, a timing controller (TMGG) 29, a source driving circuit (SDRV) 28 and a display driving circuit (GDRV: Gout signal generation circuit) 6. The host interface (HSTIF) 31 is an interface circuit for receiving a control command or image data which is input from the host 20. The image data is temporarily held in a buffer 30, is read out by the timing controller (TMGG) 29 at an appropriate timing, and is output from the source driving circuit (SDRV) 28. The timing controller (TMGG) 29 sends out image data, and simultaneously outputs a signal, for specifying coordinates (line) by which the image data is to be displayed, to the display panel 15 through the Gout signal generation circuit (GDRV) 6. The touch control circuit 24 is configured to include a touch detection signal driving circuit (TxD: Tx signal generation circuit) 7, a touch state detection circuit (RxR: Rx circuit) 8, a RAM 32, and a control circuit (CNT) 33. The Tx signal generation circuit (TxD) 7 generates and outputs a signal for the touch detection signal 17 by the control circuit (CNT) 33. The Rx circuit (RxR) 8 receives the touch sensing signal 16, and temporarily stores, for example, an A/D converted digital value in the RAM 32. The control circuit (CNT) 33 determines a touch state or touch coordinates by reading out and analyzing a digitized touch sensing signal from the RAM 32, sends out a determination result to the MPU 25, or holds the determination result so as to be read out from the MPU 25. The MPU 25 may be configured to read out the digitized touch sensing signal instead of the control circuit (CNT) 33, and determine the touch state or the touch coordinates. The control circuit (CNT) 33 may be configured to receive a vertical synchronizing signal VSYNC and a horizontal synchronizing signal HSYNC from the timing controller (TMGG) 29 of the display panel driving circuit 23, and synchronize display timing with sensing timing. In addition, display and touch sensing may be alternately performed in time division. Since the influence of display noise on touch sensing can be suppressed by performing time division, it is possible to improve the sensitivity of sensing, or to suppress the power consumption of a circuit for obtaining predetermined sensing sensitivity.

The semiconductor device 1 of the present embodiment further includes the connection switching circuit 3, terminals 2_1 to 2_5, the protection circuit 4, the switching control circuit 5, a DCDC conversion circuit 26 that generates an internal power source from a power source Vcc applied from the outside, and a reset circuit 27. The switching control circuit 5 may not be a pure hardware circuit, but may be mounted as a portion of a function of the MPU 25. In FIG. 2, the terminal 2_1 and the terminal 2_2 are signal output terminals connected to the source terminal group 14 and the gate terminal group 15 of the display panel 21, respectively, the terminal 2_3 is an input terminal for receiving the touch sensing signal 16, the terminal 2_4 is an output terminal of the touch detection signal 17, and the terminal 2_5 is an input and output terminal for performing the delivery of a signal to and from the host 20. Although mentioned in a fixed manner, the terminals 2_2, 2_3, and 2_4 are configured to be capable of being switched with each other. The terminal 2_5 is called a host interface terminal group, the terminal 2_1 is called a source output terminal group, and a terminal serving as a switching object between the terminals 2_2, 2_3, and 2_4 is called a first terminal group. The reason to exclude the source output terminal group 2_1 from the switching objects is because the number of source output terminal groups 2_1 is large, and a pad is often mounted at a narrow pitch, the source output terminal group is unsuitable for switching. In addition, in the present embodiment, the reason to exclude the host interface terminal group 2_5 from the switching objects is because the host interface terminal group is a standard digital signal, and a command can be received from the host 20 before terminal switching. However, the present invention is not limited thereto.

The DCDC conversion circuit 26 generates an internal power source from the power source Vcc applied from the outside. The generated internal power source includes $V_{GH}$ and $V_{GL}$ which are highest and lowest voltage levels, respectively, of the amplitude of a signal output by the Gout signal generation circuit (GDRV) 6, $V_{TxH}$ and $V_{TxL}$ which are highest and lowest voltage levels, respectively, of the amplitude of a touch detection signal output by the Tx signal generation circuit (TxD) 7, and $V_{RxH}$ and $V_{RxL}$ which are highest and lowest voltage levels, respectively, of the amplitude of a signal allowed to be received by the Rx circuit (RxR) 8. A power source for an operation of other circuits including the MPU 25 may be included therein. In addition, a regulator circuit for stabilization may be added to each power source. By adding the regulator circuit, it is possible to suppress a fluctuation in signal amplitude due to a load, and to stabilize an operation. It is also possible to cope with a plurality of voltage levels required, using one output voltage which is output by one DCDC conversion circuit 26. For example, in case that $V_{GH}$ and $V_{TxH}$ are the same voltage or voltage levels close to each other, one output voltage which is output by the same DCDC conversion circuit 26 is supplied to $V_{GH}$ and $V_{TxH}$. Thereby, it is possible to simplify the DCDC conversion circuit 26. Further, by adding a plurality of regulator circuits to one output voltage which is output by one DCDC conversion circuit 26, outputting the same or different voltage levels, and the like, the DCDC conversion circuits and the regulators can be combined arbitrarily.

The switching control circuit 5 controls switching of a connection relationship with the first terminal group with respect to at least two of the Gout signal generation circuit (GDRV) 6, the Tx signal generation circuit (TxD) 7 and the Rx circuit (RxR) 8. In the present embodiment, switching between the Gout signal generation circuit (GDRV) 6 and the Tx signal generation circuit (TxD) 7 will be described below.

Figure 4:
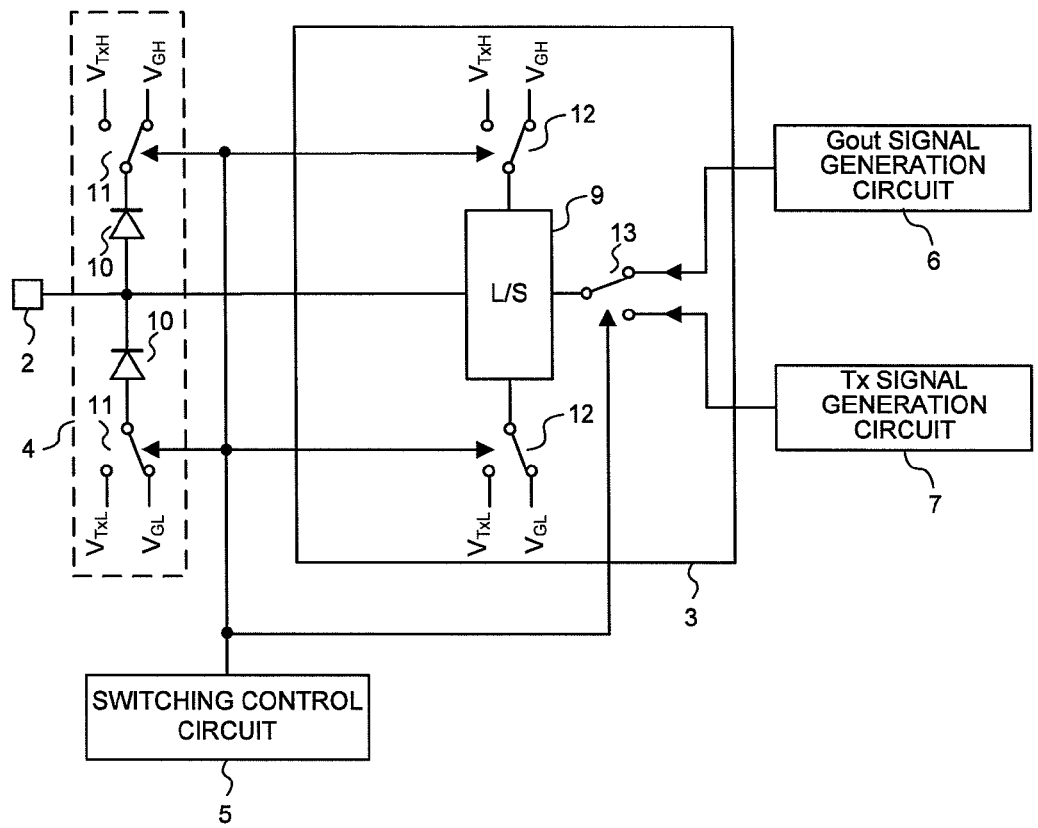
FIG. 4 is a circuit diagram illustrating a configuration example of a switching circuit that switches two outputs.

FIG. 4 is a circuit diagram illustrating a configuration example of the connection switching circuit 3 that switches two outputs. The connection switching circuit 3 is configured to include a level shift circuit (L/S) 9 which is capable of setting a converted voltage level by a shift voltage changeover switch 12, and a signal changeover switch 13. Either one selected out of the Gout signal generation circuit (GDRV) 6 and the Tx signal generation circuit (TxD) 7 is input to a level shift circuit 9, and the signal amplitude level is converted in accordance with a signal amplitude to be output and is connected to the first terminal group. The switching control circuit 5 functions as a protection voltage setting circuit, and sets a protection voltage level of the protection circuit 4 in accordance with the signal amplitude of the circuit selected by the connection switching circuit 3. In case that the Gout signal generation circuit (GDRV) 6 is selected, the shift voltage changeover switch 12 selects the $V_{GH}/V_{GL}$ side, and the protection voltage changeover switch 11 also selects the $V_{GH}/V_{GL}$ side in conformity therewith. On the other hand, in case that the Tx signal generation circuit (TxD) 7 is selected, the shift voltage changeover switch 12 selects the $V_{TxH}/V_{TxL}$ side, and the protection voltage changeover switch 11 also selects the $V_{TxH}/V_{TxL}$ side in conformity therewith.

Thereby, it is possible to provide a liquid crystal display driver corresponding to a touch panel which is capable of appropriately allocating the terminal arrangement of the output terminal (GIP terminal 2_2) of the signal for driving the display panel gate terminal group and the terminal (Tx terminal 2_4) for transmitting the touch detection signal, in conformity with various forms of the display panel including the touch sensor. It is possible to improve the degree of freedom of the routing of wiring to the liquid crystal display panel and the touch panel. In addition, the protection voltage of the terminal can be selectively switched in accordance with a function allocated to the terminal.

The connection switching circuit 3 controls switching of a connection relationship with the first terminal group with respect to at least two of the Gout signal generation circuit (GDRV) 6, the Tx signal generation circuit (TxD) 7 and the Rx circuit (RxR) 8. A configuration example of the connection switching circuit 3 in a case other than that of the above-mentioned combination will be described below with reference to FIGS. 5 to 7. Although collectively called the "first terminal group", it may be configured to be capable of switching a connection relationship for each individual terminal, and may be configured to be capable of switching a connection relationship for each of a plurality of terminal groups. A plurality of groups of a plurality of terminal groups capable of switching a connection relationship may be included.

Figure 5:
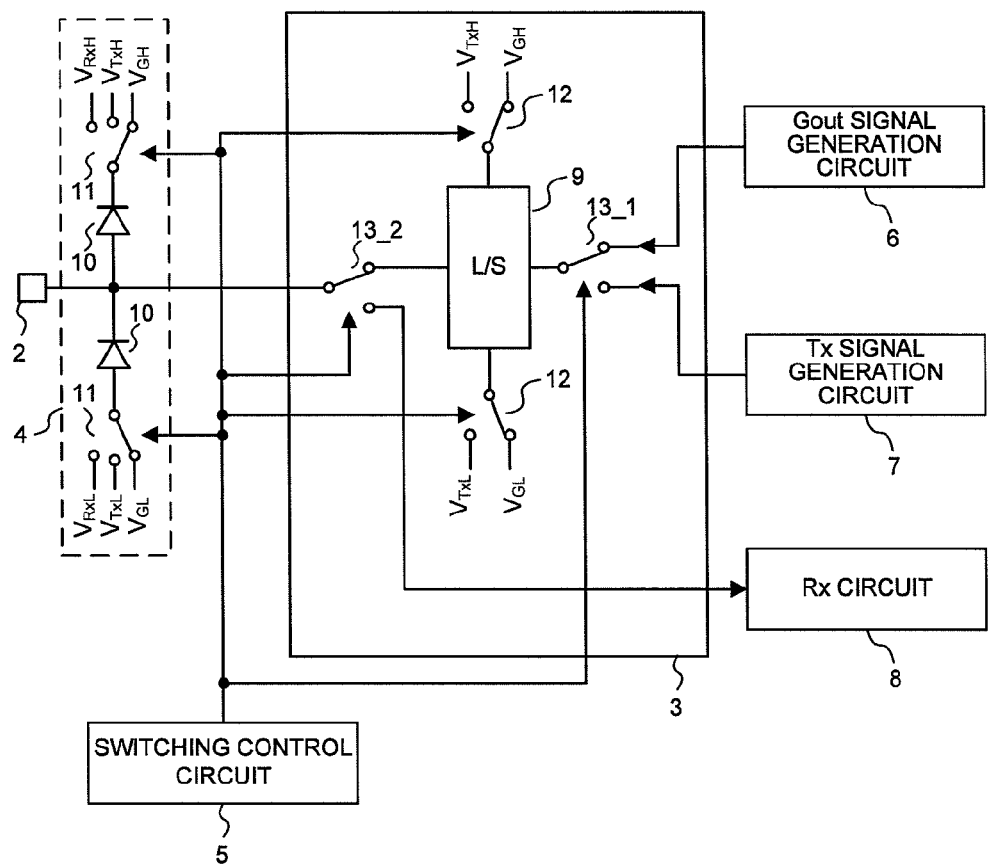
FIG. 5 is a circuit diagram illustrating a configuration example of a switching circuit that switches two outputs+one input.

FIG. 5 is a circuit diagram illustrating a configuration example of the connection switching circuit 3 that switches two outputs+one input. A configuration is shown in which connection with any of three of the Gout signal generation circuit (GDRV) 6, the Tx signal generation circuit (TxD) 7 and the Rx circuit (RxR) 8, and the terminal 2 is switched. The connection switching circuit 3 is configured to include the level shift circuit (L/S) 9 which is capable of setting a converted voltage level by the shift voltage changeover switch 12, and signal changeover switches 13_1 and 13_2. Either one selected out of the Gout signal generation circuit (GDRV) 6 and the Tx signal generation circuit (TxD) 7 is input to the level shift circuit 9 through the signal changeover switch 13_1, and the signal amplitude level is converted in accordance with the signal amplitude to be output and is connected to the terminal 2. In case that either the Gout signal generation circuit (GDRV) 6 or the Tx signal generation circuit (TxD) 7 is selected, the terminal 2 is connected to the level shift circuit (L/S) 9 by the signal changeover switch 13_2. On the other hand, in case that the Rx circuit (RxR) 8 is selected, the terminal 2 is connected to the Rx circuit (RxR) 8 by the signal changeover switch 13_2. The switching control circuit 5 functions as a protection voltage setting circuit, and sets a protection voltage level of the protection circuit 4 in accordance with the signal amplitude of the circuit selected by the connection switching circuit 3. In case that the Gout signal generation circuit (GDRV) 6 is selected, the shift voltage changeover switch 12 selects the $V_{GH}/V_{GL}$ side, and the protection voltage changeover switch 11 also selects the $V_{GH}/V_{GL}$ side in conformity therewith. On the other hand, in case that the Tx signal generation circuit (TxD) 7 is selected, the shift voltage changeover switch 12 selects the $V_{TxH}/V_{TxL}$ side, and the protection voltage changeover switch 11 also selects the $V_{TxH}/V_{TxL}$ side in conformity therewith. In case that the Rx circuit (RxR) 8 is selected, the protection voltage changeover switch 11 selects the $V_{RxH}/V_{RxL}$ side in conformity therewith.

Thereby, it is possible to form the connection switching circuit 3 which is capable of switching connection between any of three of the Gout signal generation circuit (GDRV) 6, the Tx signal the generation circuit (TxD) 7 and the Rx circuit (RxR) 8, and the terminal 2.

Figure 6:
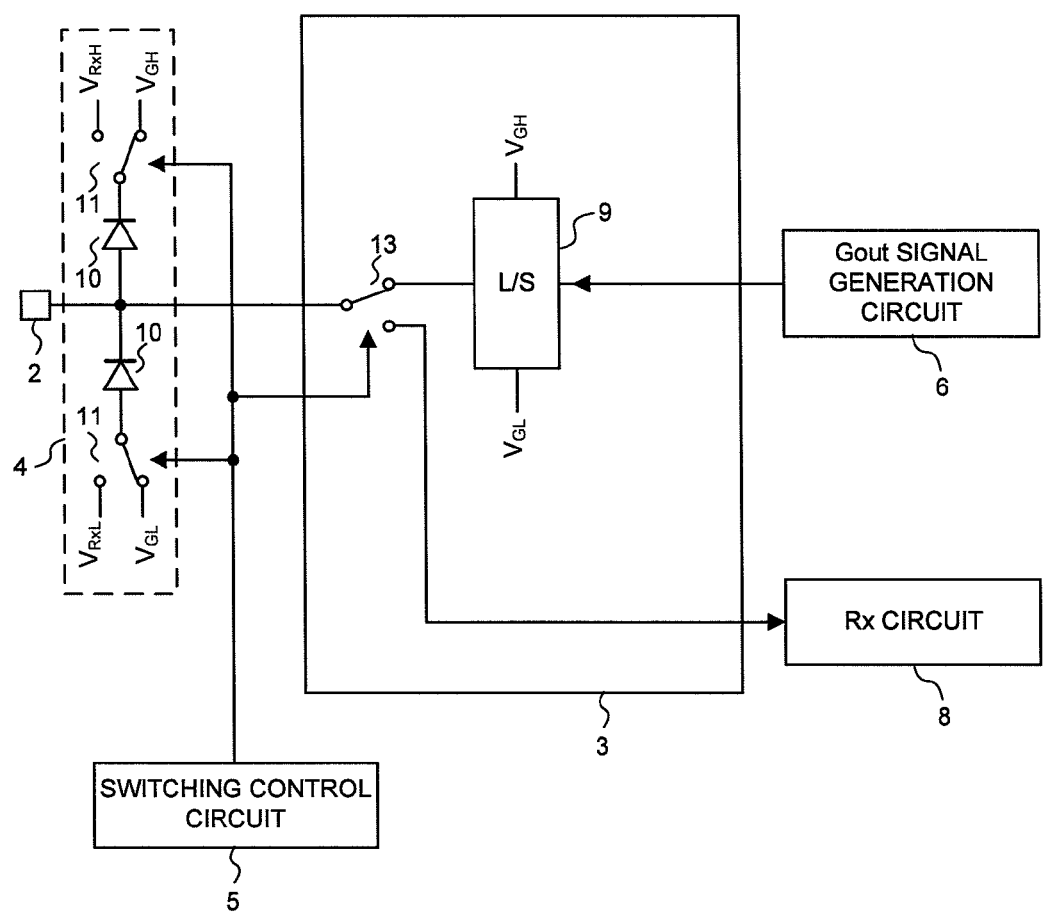
FIG. 6 is a circuit diagram illustrating a configuration example of a switching circuit that switches one output (display driving)+one input.

FIG. 6 is a circuit diagram illustrating a configuration example of the connection switching circuit 3 that switches one output (display driving)+one input. A configuration is shown in which connection between any of the Gout signal generation circuit (GDRV) 6 and the Rx circuit (RxR) 8, and the terminal 2 is switched. As compared with the circuit shown in FIG. 5, the shift voltage changeover switch 12 is not connected to the level shift circuit (L/S) 9, a conversion level is fixed to the $V_{GH}/V_{GL}$ side, and a signal from the Gout signal generation circuit (GDRV) 6 is input without going through a signal changeover switch. In case that the Gout signal generation circuit (GDRV) 6 is selected, the terminal 2 is connected to the level shift circuit (L/S) 9 by the signal changeover switch 13. In case that the Rx circuit (RxR) 8 is selected, the terminal 2 is connected to the Rx circuit (RxR) 8 by the signal changeover switch 13. The protection voltage changeover switch 11 selects the $V_{GH}/V_{GL}$ side in case that the Gout signal generation circuit (GDRV) 6 is selected, and selects the $V_{RxH}/V_{RxL}$ side in case that the Rx circuit (RxR) 8 is selected.

Figure 7:
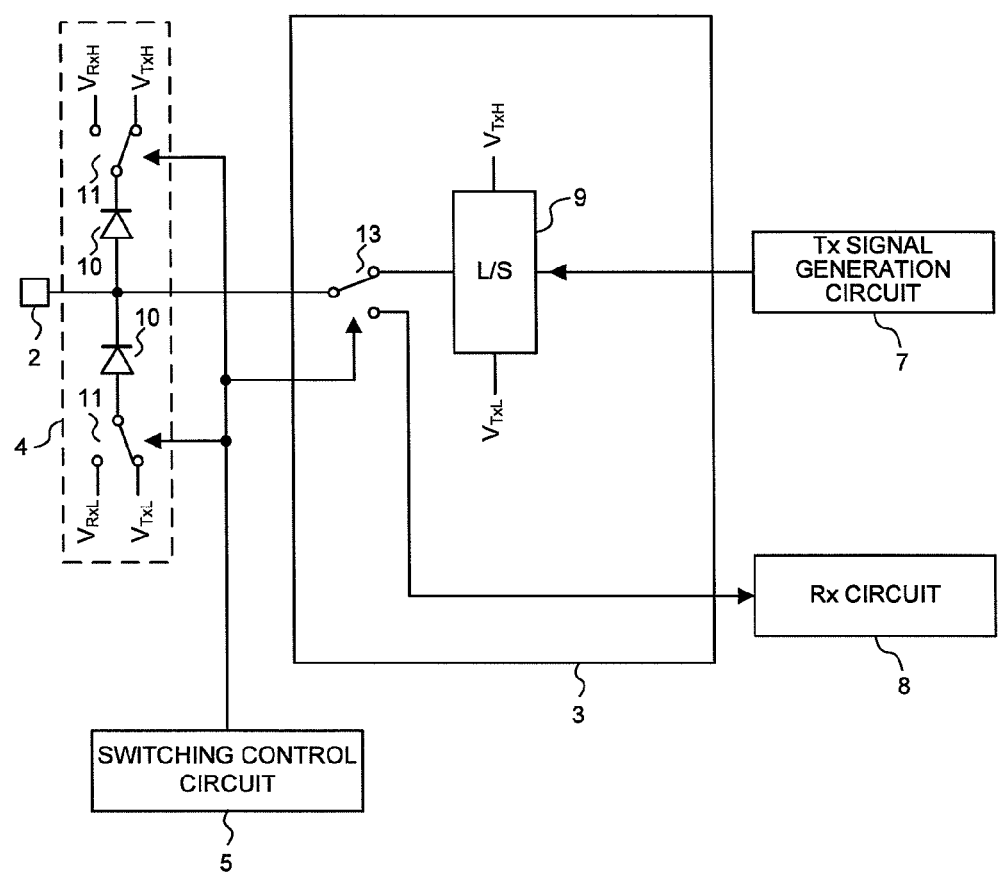
FIG. 7 is a circuit diagram illustrating a configuration example of a switching circuit that switches one output (touch sensor driving)+one input.

FIG. 7 is a circuit diagram illustrating a configuration example of the connection switching circuit 3 that switches one output (touch sensor driving)+one input. A configuration is shown in which connection between any of the Tx signal generation circuit (TxD) 7 and the Rx circuit (RxR) 8 and the terminal 2 is switched. As compared with the circuit shown in FIG. 6, the Gout signal generation circuit (GDRV) 6 is replaced by the Tx signal generation circuit (TxD) 7, and $V_{TxH}/V_{TxL}$ is applied instead of $V_{GH}/V_{GL}$.

Since The connection switching circuit 3 is formed by appropriately selecting or combining the circuits of FIGS. 4 to 7, it is possible to switch a connection relationship for each individual terminal, and to switch connection relationships collectively for each of a plurality of terminal groups. Further, it is possible to include a plurality of groups of a plurality of terminal groups capable of switching the connection relationship.

Figure 8:
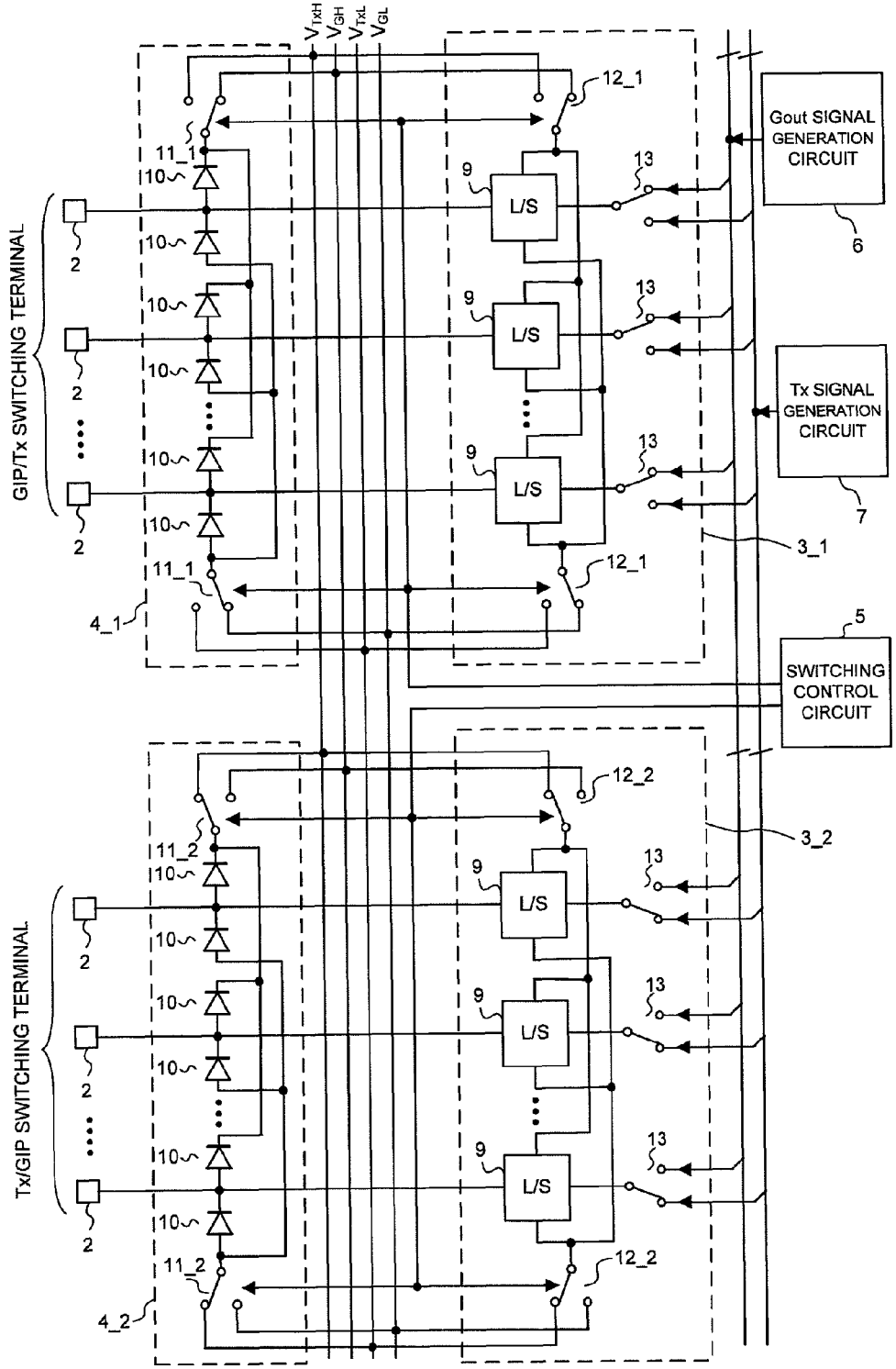
FIG. 8 is a circuit diagram illustrating a configuration example of a switching circuit that switches two outputs by combining a plurality of terminals.

FIG. 8 is a circuit diagram illustrating a configuration example of the connection switching circuit 3 that switches two outputs by combining a plurality of terminals. A protection circuit 4_1 capable of switching a protection voltage and a connection switching circuit 3_1 are connected to a plurality of terminals called GIP/Tx switching terminals. The protection circuit 4_1 capable of switching a protection voltage includes a diode 10 for each terminal 2, but a protection voltage changeover switch 11_1 is provided with both the high potential side and the low potential side in common to all the terminals of the protection circuit 4_1. The connection switching circuit 3_1 is provided with the level shift circuit (L/S) 9 connected to each terminal 2, but a shift voltage changeover switch 12_1 is provided with both the high potential side and the low potential side in common to all the terminals of the connection switching circuit 3_1. On the other hand, a protection circuit 4_2 capable of switching a protection voltage and a connection switching circuit 3_2 are connected to a plurality of terminals called Tx/GIP switching terminals. Similarly, the protection circuit 4_2 capable of switching a protection voltage includes the diode 10 for each terminal 2, but a protection voltage changeover switch 11_2 is provided with both the high potential side and the low potential side in common to all the terminals of the protection circuit 4_2. Similarly, the connection switching circuit 3_2 is provided with the level shift circuit (L/S) 9 connected to each terminal 2, but a shift voltage changeover switch 12_2 is provided with both the high potential side and the low potential side in common to all the terminals of the connection switching circuit 3_2. In case that it is selected that the connection switching circuit 3_1 is connected to the Gout signal generation circuit (GDRV) 6, the protection voltage changeover switch 11_1 and the shift voltage changeover switch 12_1 apply $V_{GH}/V_{GL}$ to each of a plurality of level shift circuits (L/S) 9 included in the protection circuit 4_1 and the connection switching circuit 3_1. In this case, it is selected that the connection switching circuit 3_2 is connected to the Tx signal generation circuit (TxD) 7, and the protection voltage changeover switch 11_2 and the shift voltage changeover switch 12_2 apply $V_{TxH}/V_{TxL}$ to each of a plurality of level shift circuits (L/S) 9 included in the protection circuit 4_2 and the connection switching circuit 3_2.

Thereby, in case that the GIP/Tx switching terminals are connected to the Gout signal generation circuit (GDRV) 6 collectively, the Tx/GIP switching terminals are controlled to be connected to the Tx signal generation circuit (TxD) 7 collectively. In this case, appropriate voltages are applied collectively to the respective level shift circuits (L/S) 9 included in the protection circuits 4_1 and 4_2 and the connection switching circuits 3_1 and 3_2. Collective control is performed, and thus it is possible to reduce the scale of a circuit required for the protection voltage changeover switch 11, the shift voltage changeover switch 12 or the like.

A mounting state in case that the semiconductor device 1 is mounted to the display panel with a touch sensor will be described with reference to FIGS. 3 and 9 to 14.

The semiconductor device 1 is formed by integrating the display panel driving circuit 23 that generates a signal for driving the display panel 21, the touch control circuit 24 that generates the touch detection signal 17 and receives the touch sensing signal 16, and the MPU 25 that controls the entirety of the device, on a single semiconductor substrate (for example, silicon substrate). Taking a liquid crystal display panel as an example, the display panel 21 is formed by superimposing a TFT glass substrate 40, a color filter glass 41 and a cover glass 43. The display panel is formed by superimposing a touch panel glass 42 and the cover glass 43. In case that the display panel and the touch sensor are integrated with each other, in an out-cell type, the display panel is formed by superimposing a touch sensor formed by superimposing the color filter glass 41 on the TFT glass substrate 40 and further superimposing the touch panel glass 42 and the cover glass 43 thereon. In an in-cell type, the display panel in which the touch panel glass 42 is omitted is formed by superimposing the color filter glass 41 and the cover glass 43 on the TFT glass substrate 40. The source terminal group 14 and the gate terminal group 15 which are elements, wiring and terminals for applying a voltage to a liquid crystal are formed on the TFT glass 40. In a large number of display panels, the gate terminal group 15 is arranged on both sides or one side perpendicular to the side where the source terminal group 14 is disposed. Terminals to which the touch detection signal 17 and the touch sensing signal 16 are supplied are provided on the same surface as the glass surface on which each electrode is formed, and can be wired by a flexible printed circuit (FPC) 44.

Figure 3:
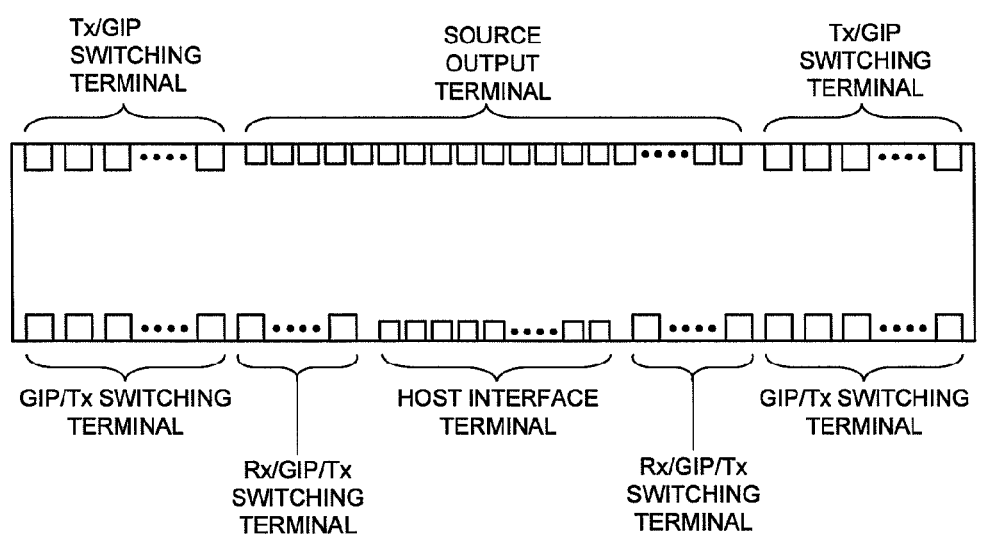
FIG. 3 is a terminal arrangement diagram of a semiconductor device according to a first embodiment.

FIG. 3 is a terminal arrangement diagram of the semiconductor device according to the first embodiment.

As shown in FIG. 3, the source output terminal 2_1 is disposed, and the Tx/GIP switching terminals are disposed on both sides thereof. The host interface terminal 2_5 is disposed on the opposite side of the side where the source output terminal 2_1 is disposed, the Rx/GIP/Tx switching terminals are disposed on both sides thereof, and the GIP/Tx switching terminals are further disposed on the outside thereof. The other terminals, not shown, are disposed, for example, between the host interface terminal 2_5 and the Rx/GIP/Tx switching terminals. Since the Rx terminal 2_3 is sensitive to noise, the terminal may be disposed separated as much as possible from the source output terminal 2_1 and the host interface terminal 2_5 which are generation sources of noise, in consideration of a case where the Rx/GIP/Tx switching terminals function as the Rx terminal 2_3, or the propagation of noise may be cut off by providing a ground terminal or the like therebetween.

As described above with reference to FIG. 8, in case that the Tx/GIP switching terminals are connected internally to the Tx signal generation circuit (TxD) 7, the GIP/Tx switching terminals are switched so as to be connected to the Gout signal generation circuit (GDRV) 6. As described with reference to FIG. 5, the Rx/GIP/Tx switching terminals are terminals capable of switching connection with the terminal between any of three of the Rx circuit (RxR) 8, the Gout signal generation circuit (GDRV) 6 and the Tx signal generation circuit (TxD) 7, and the Tx/GIP switching terminals and the GIP/Tx switching terminals can be controlled independently of each other. The difference between the numbers of Tx terminals and Gout terminals can be absorbed by the Rx/GIP/Tx switching terminals.

Figure 9A:
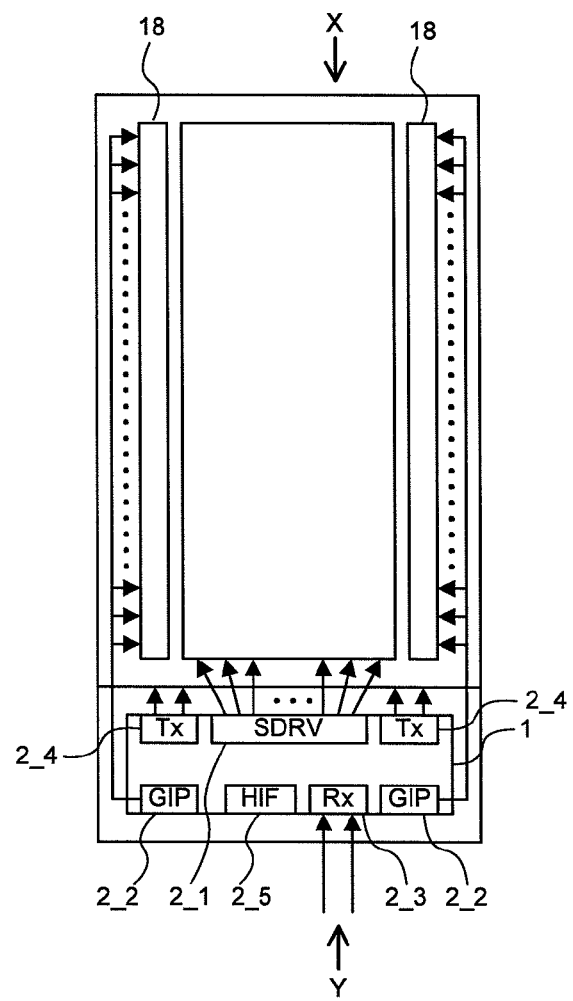
FIGS. 9A and 9B are diagrams illustrating a state where the semiconductor device according to the first embodiment is mounted to a display panel with an in-cell type touch sensor (Rx on color filter glass and Tx on TFT glass).
Figure 9B:
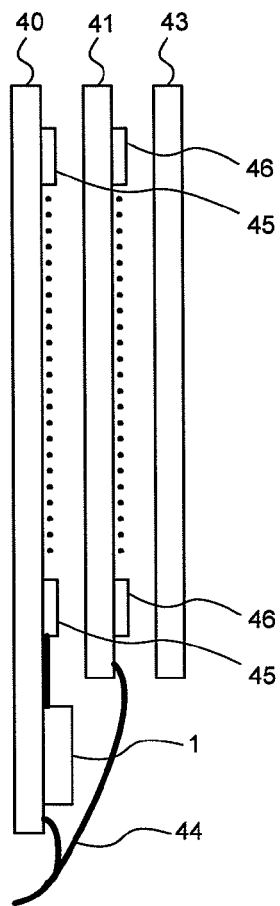

FIGS. 9A and 9B are diagrams illustrating a state where the semiconductor device according to the first embodiment is mounted to a display panel with an in-cell type touch sensor (Rx on color filter glass and Tx on TFT glass). The semiconductor device 1 is mounted on the TFT glass substrate 40, and is electrically connected by, for example, an anisotropic conductive film (ACF) or the like. FIG. 9A shows a top view, and FIG. 9B shows a cross-sectional view taken along line X-Y. These drawings are not accurate diagrams, but diagrams illustrating schematic arrangement. For example, in the cross-sectional view, the TFT glass 40, the color filter glass 41 and the cover glass 43 are drawn separately from each other, but are actually bonded to each other. The same is true of FIGS. 10A and 10B to FIGS. 14A and 14B.

The source output terminal 2_1 is wired with the source terminal group 14 (not shown) of the display panel by wiring on the TFT glass 40. The Tx/GIP switching terminals functioning as the Tx terminal 2_4 by switching are connected to the touch detection signal 17 on the TFT glass 40 by the wiring on the TFT glass 40. On the other hand, since the GIP/Tx switching terminals functioning as the GIP terminal 2_2 by switching are disposed on the host interface side opposite to the source output side, the terminals are connected to the display panel gate terminal group 15 on the TFT glass 40 by the wiring on the TFT glass 40, while bypassing the Tx/GIP switching terminals. The Rx/GIP/Tx switching terminals functioning as the Rx terminal 2_3 by switching are connected to the touch sensing signal 16 on the color filter glass 41 by the FPC 44. The FPC 44 is connected to another FPC 44 which is connected to a connection pad provided on the TFT glass 40, is once wired in a direction away from the display panel, and is connected to the touch sensing signal 16 on the color filter glass 41. For this reason, the arrangement of the Rx/GIP/Tx switching terminals functioning as the Rx terminal 2_3 may be made on the same side as that of the host interface terminal 2_5. In addition, since Gout signal wiring and Tx signal wiring are often disposed on both sides of the display panel, the GIP/Tx switching terminals and the Tx/GIP switching terminals may be disposed from the lateral face of the semiconductor device 1.

Figure 10A:
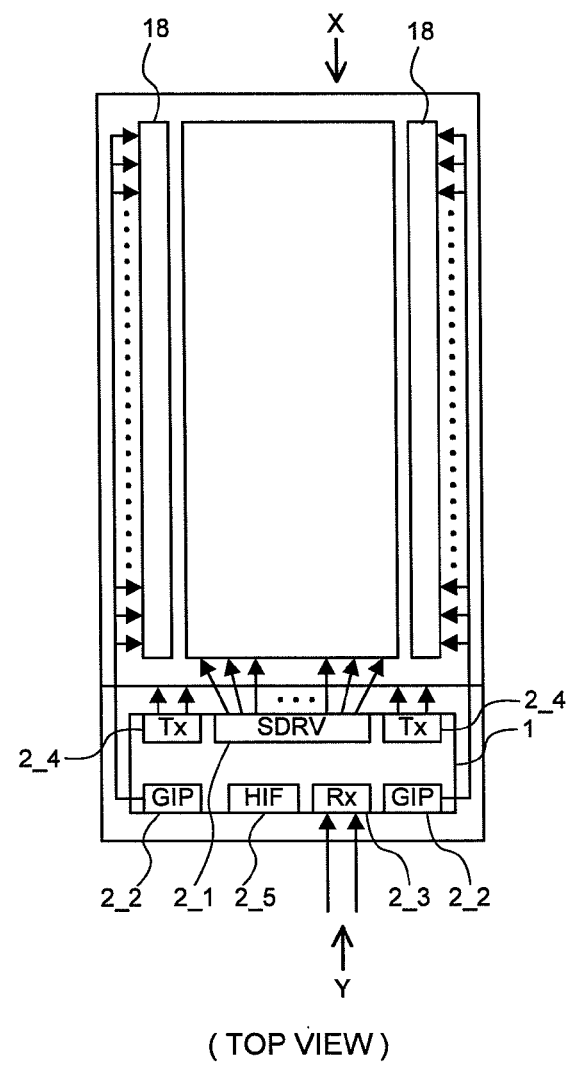
FIGS. 10A and 10B are diagrams illustrating a state where the semiconductor device according to the first embodiment is mounted to the display panel with an in-cell type touch sensor (Rx on cover glass backside and Tx on TFT glass).
Figure 10B:
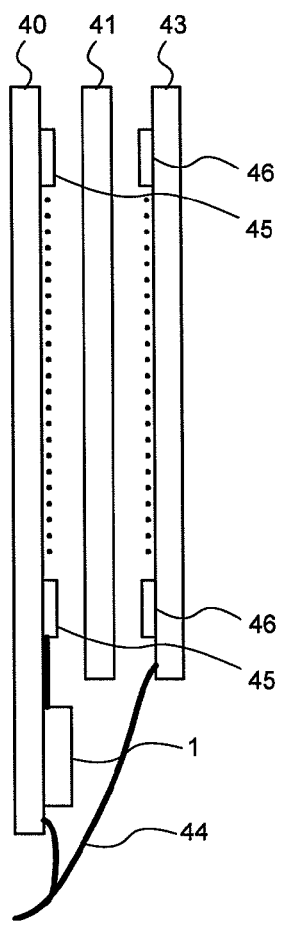

FIGS. 10A and 10B are diagrams illustrating a state where the semiconductor device according to the first embodiment is mounted to the display panel with an in-cell type touch sensor (Rx on cover glass backside and Tx on TFT glass). The terminal switching state of the semiconductor device 1 is the same as that shown in FIGS. 9A and 9B. In addition, wiring from the source output terminal 2_1, wiring from the Tx/GIP switching terminals functioning as the Tx terminal 2_4 by switching, and wiring from the GIP/Tx switching terminals functioning as the GIP terminal 2_2 are mounted through wiring on the TFT glass substrate, as is the case with FIGS. 9A and 9B. The Rx/GIP/Tx switching terminals functioning as the Rx terminal 2_3 by switching are connected to the FPC 44 which is once wired in a direction away from the display panel. Since the touch sensing signal 16 is formed on the backside of the cover glass 43 rather than on the color filter glass 41, the FPC 44 which is connected to the backside of the cover glass 43 and the FPC 44 which is connected to a connection pad provided on the TFT glass 40 and is once wired in a direction away from the display panel are connected to each other.

Figure 11A:
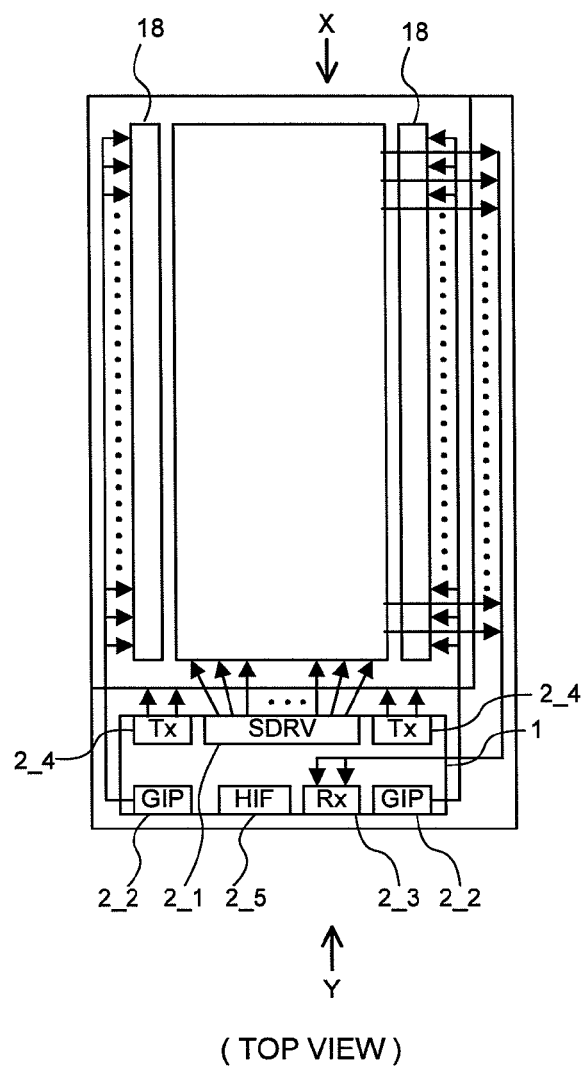
FIGS. 11A and 11B are diagrams illustrating a state where the semiconductor device according to the first embodiment is mounted to an in-cell type display panel with touch sensor (Rx and Tx on TFT glass).
Figure 11B:
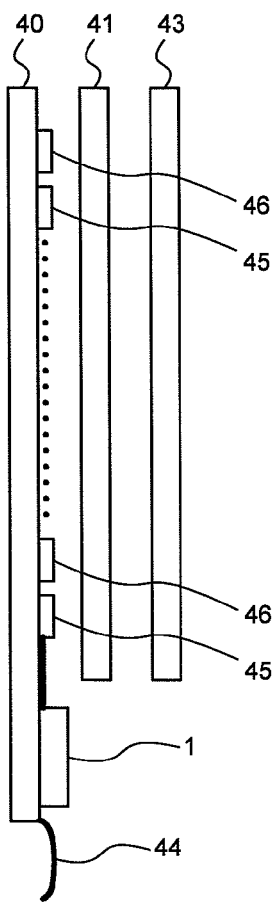

FIGS. 11A and 11B are diagrams illustrating a state where the semiconductor device according to the first embodiment is mounted to the display panel with an in-cell type touch sensor (Rx and Tx on TFT glass). The terminal switching state of the semiconductor device 1 is the same as that shown in FIGS. 9A and 9B. In addition, the wiring from the source output terminal 2_1, the wiring from the Tx/GIP switching terminals functioning as the Tx terminal 2_4 by switching, and the wiring from the GIP/Tx switching terminals functioning as the GIP terminal 2_2 are mounted through wiring on the TFT glass substrate, as is the case with FIGS. 9A and 9B. Further, the touch sensing signal 16 is also formed on the TFT glass 40, and thus is connected to the Rx/GIP/Tx switching terminals functioning as the Rx terminal 2_3 through wiring on the TFT glass substrate.

Figure 12A:
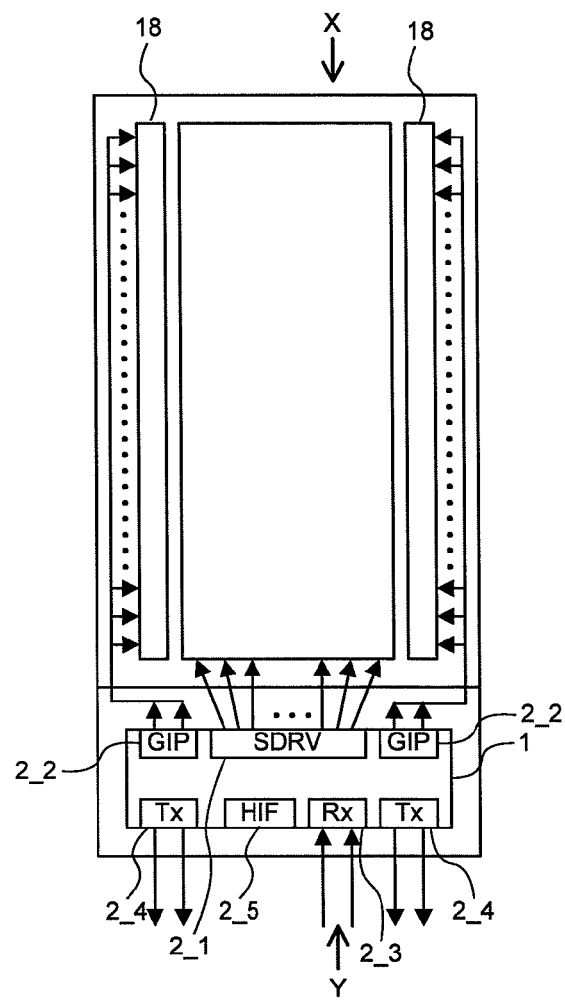
FIGS. 12A and 12B are diagrams illustrating a state where the semiconductor device according to the first embodiment is mounted to an on-cell type display panel with a touch sensor (Rx and Tx on touch panel glass).
Figure 12B:
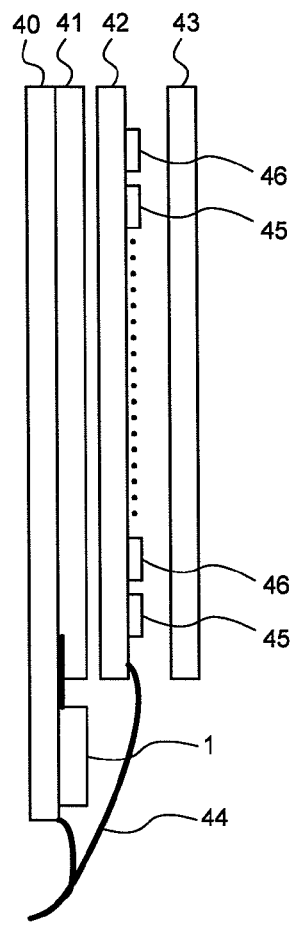

FIGS. 12A and 12B are diagrams illustrating a state where the semiconductor device according to the first embodiment is mounted to an on-cell type display panel with a touch sensor (Rx and Tx on touch panel glass). Unlike in the case of FIGS. 9A and 9B, in the terminal switching state of the semiconductor device 1, the Tx/GIP switching terminals disposed on the same side as the source output terminal 2_1 are switched so as to function as the GIP terminal 2_2, and the GIP/Tx switching terminals disposed on the same side as the host interface terminal 2_5 are switched so as to function as the Tx terminal 2_4. The wiring from the source output terminal 2_1 and the wiring from the Tx/GIP switching terminals functioning as the GIP terminal 2_2 by switching are mounted through the wiring on the TFT glass substrate. The GIP/Tx switching terminals functioning as the Tx terminal 2_4 are connected to the FPC 44 which is once wired in a direction away from the display panel. Since the touch detection signal 17 is formed on the touch panel glass 42 rather than on the color filter glass 41, the FPC 44 which is connected to the touch panel glass 42 and the above-mentioned FPC 44 which is connected to a connection pad provided on the TFT glass 40 and is once wired in a direction away from the display panel are connected to each other. Similarly, the Rx/GIP/Tx switching terminals functioning as the Rx terminal 2_3 are connected to the touch sensing signal 16 formed on the touch panel glass 42.

Figure 13A:
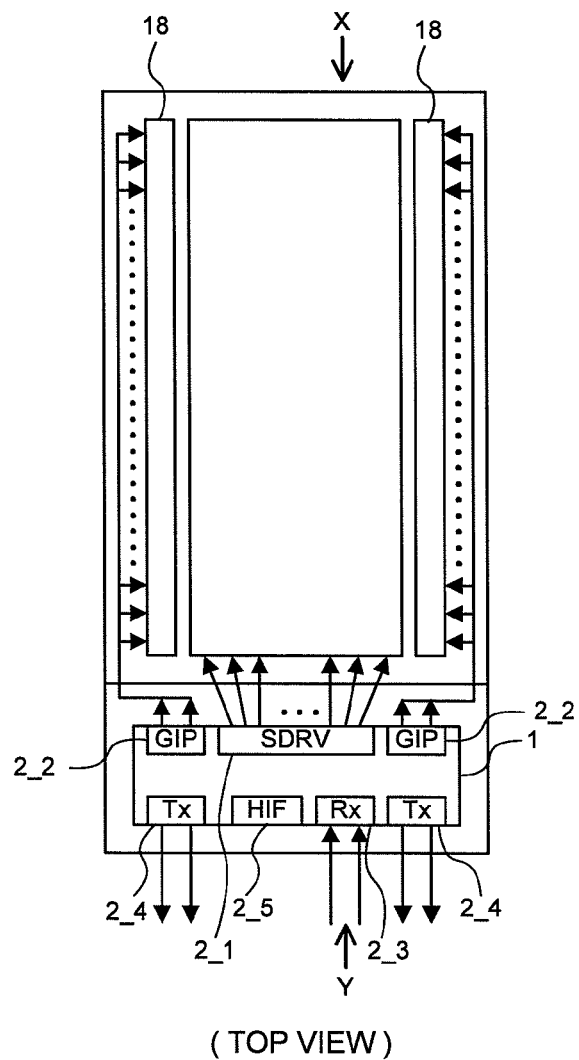
FIGS. 13A and 13B are diagrams illustrating a state where the semiconductor device according to the first embodiment is mounted to an on-cell type display panel with a touch sensor (Rx and Tx on color filter glass).
Figure 13B:
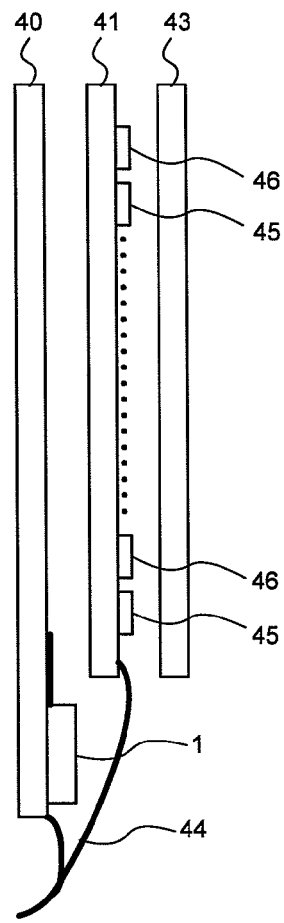

FIGS. 13A and 13B are diagrams illustrating a state where the semiconductor device according to the first embodiment is mounted to an on-cell type display panel with a touch sensor (Rx and Tx on color filter glass). The terminal switching state of the semiconductor device 1 is the same as that shown in FIGS. 12A and 12B. In addition, the wiring from the source output terminal 2_1 and the wiring from the GIP/Tx switching terminals functioning as the GIP terminal 2_2 are mounted through the wiring on the TFT glass substrate, as is the case with FIGS. 12A and 12B. The wiring from the Tx/GIP switching terminals functioning as the Tx terminal 2_4 by switching and the Rx/GIP/Tx switching terminals functioning as the Rx terminal 2_3 by switching are connected to the FPC 44 which is once wired in a direction away from the display panel. Since the touch detection signal 17 and the touch sensing signal 16 are formed on the color filter glass 41 rather than on the touch panel glass 42, the FPC 44 which is connected to the color filter glass 41 and the above-mentioned FPC 44 which is connected to a connection pad provided on the TFT glass 40 and is once wired in a direction away from the display panel are connected to each other.

Figure 14A:
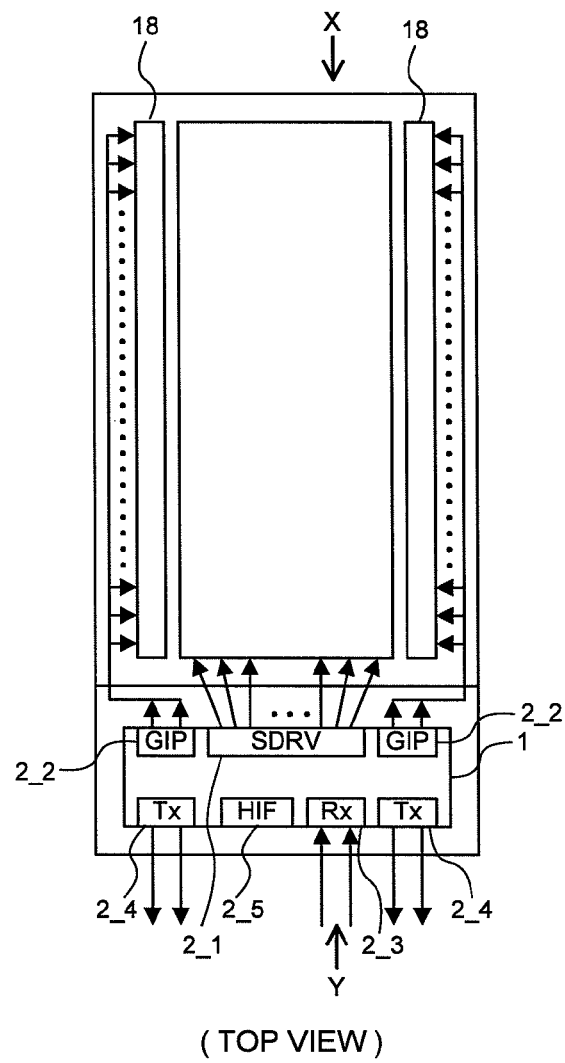
FIGS. 14A and 14B are diagrams illustrating a state where the semiconductor device according to the first embodiment is mounted to an on-cell type display panel with a touch sensor (Rx and Tx on cover glass backside).
Figure 14B:
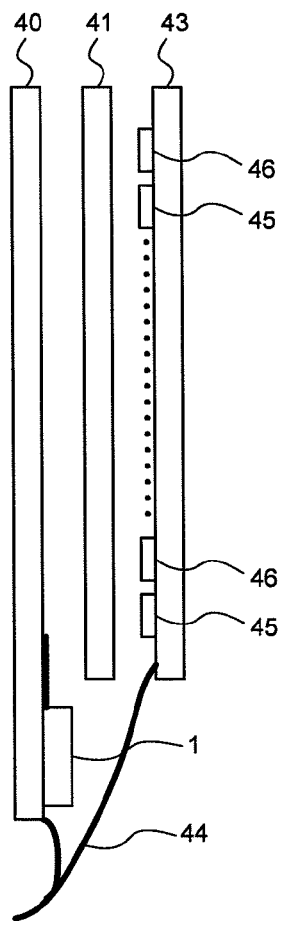

FIGS. 14A and 14B are diagrams illustrating a state where the semiconductor device according to the first embodiment is mounted to an on-cell type display panel with a touch sensor (Rx and Tx on cover glass backside). The terminal switching state of the semiconductor device 1 is the same as that shown in FIGS. 12A and 12B and FIGS. 13A and 13B. In addition, the wiring from the source output terminal 2_1 and the wiring from the GIP/Tx switching terminals functioning as the GIP terminal 2_2 are mounted through the wiring on the TFT glass substrate, as is the case with FIGS. 12A and 12B and FIGS. 13A and 13B. The wiring from the Tx/GIP switching terminals functioning as the Tx terminal 2_4 by switching and the Rx/GIP/Tx switching terminals functioning as the Rx terminal 2_3 by switching are connected to the FPC 44 which is once wired in a direction away from the display panel. Since the touch detection signal 17 and the touch sensing signal 16 are formed on the backside of the cover glass 43, the FPC 44 which is connected the backside of the cover glass 43 and the above-mentioned FPC 44 which is connected to a connection pad provided on the TFT glass 40 and is once wired in a direction away from the display panel are connected to each other.

As described above, since the terminal arrangement can be appropriately allocated in conformity with various forms of the display panel including the touch sensor, it is possible to improve the degree of freedom of the routing of wiring to the liquid crystal display panel and the touch panel.

The switching of a terminal function has to be executed at an appropriate timing.

For example, the switching control circuit 5 is trimmed using a fuse or the like, and thus it is possible to perform switching before the semiconductor device 1 is mounted to the display panel with a touch sensor. In addition, it is also possible to establish a switching state, for example, by initializing the switching control circuit 5 in a boot-up sequence.

FIG. 15 is a timing diagram illustrating a boot-up sequence of the semiconductor device according to the first embodiment. The horizontal axis represents time, and the vertical axis represents an operation mode, a voltage of each power source, and signal waveforms. Times t0 to t4 correspond to a power supply sequence, times t6 to t8 correspond to a power-on sequence, times t8 to t11 correspond to a display-on sequence, and times t13 and subsequent times correspond to a normal display operation. In case that the power source Vcc is started to be supplied from the outside at time t1, a reset signal RESET is issued by the power-on reset circuit (POR) 27. In the drawing, the reset signal is expressed as low active. In the power supply sequence, a boot program is executed by the MPU 25, and thereby, the internal state of the semiconductor device 1 is initialized. In case that the initialization thereof is completed, an "exit_sleep_mode" command is issued from a host, and the power-on sequence is started from time t6. In the power-on sequence, the DCDC conversion circuit 26 is started up, and an operation is started in which a power source for Gout and a power source for Tx are generated from the power source Vcc supplied from the outside. Further, the same is true of a case where a power source for Rx is required. The generation sequence and the application sequence of the power source are appropriately specified. As shown in FIG. 15, the power source for Gout is started from time t7, and the power source for Tx is started from time t8. The output of a Gout signal is started from time t9, and the output of a Tx signal is started from time t10. In case that a command "set_display_ON" is input at time t12, a normal display operation is started from time t13. A terminal function switching control signal which is output from the switching control circuit 5 is set during the above-mentioned boot program by the MPU 25, and thus is established at time t3. Until this point in time, the power source for Gout and the power source for Tx are not generated and output, and $V_{GH}$, $V_{GL}$, $V_{TxL}$, and $V_{TxL}$ are equal to 0 V which is the ground level. In case that $V_{RxH}$ and $V_{RxL}$ are generated by the DCDC conversion circuit 26, $V_{RxH}$ and $V_{RxL}$ are also equal to 0 V which is the ground level until this point in time. Thereby, until a connection relationship is appropriately set, the level shift circuit 9 does not output an unsuitable voltage due to an operation which is not intended. Thereby, power sources are supplied in an appropriate sequence within a chip, and thus it is possible to prevent a problem such as the flow of an excessive over-current from occurring.

Second Embodiment

Figure 16:
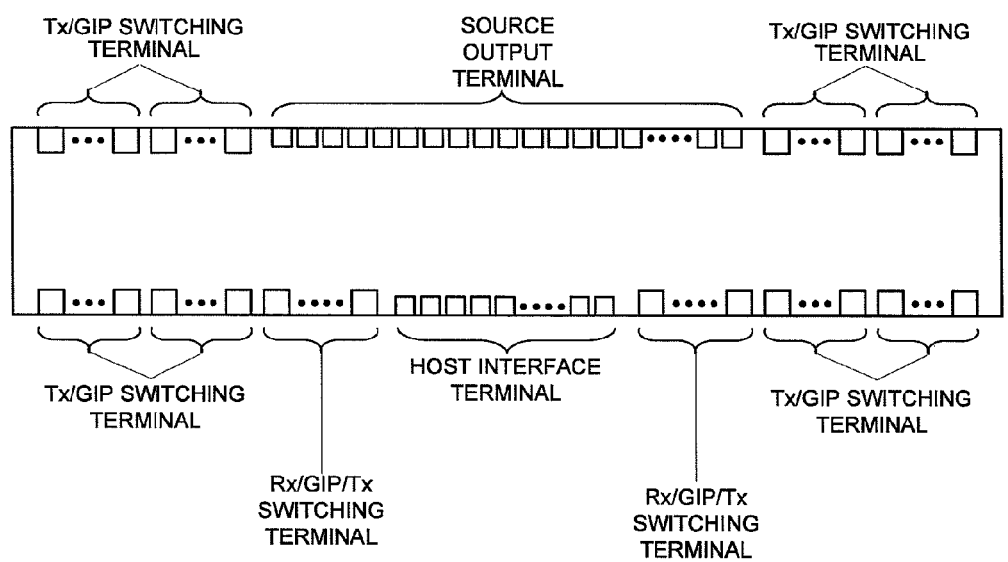
FIG. 16 is a terminal arrangement diagram of a semiconductor device according to a second embodiment.

FIG. 16 is a terminal arrangement diagram of a semiconductor device according to a second embodiment.

In the first embodiment, the GIP/Tx switching terminals and the Tx/GIP switching terminals which are capable of switching a plurality of terminals collectively are disposed on each of the source output side and the host interface side, using the connection switching circuit 3 shown in FIG. 8. However, in the present embodiment, the GIP/Tx switching terminals and the Tx/GIP switching terminals are disposed on the source output side, and the GIP/Tx switching terminals and the Tx/GIP switching terminals are also disposed on the host interface side.

Thereby, it is possible to drive a plurality of touch panels. For example, the display panel including the touch sensor can be mounted so as to be driven, and then be connected to a touch sensing dedicated touch panel.

As stated above, while the present invention devised by the inventor has been described in detail based on the embodiments, the present invention is not limited thereto. It goes without saying that various modifications and changes can be made without departing from the scope of the invention.

For example, functional blocks to be mounted to the semiconductor device 1 can be appropriately added or removed. The mounting of the DCDC conversion circuit 26 may be omitted, and $V_{GH}$, $V_{GL}$, $V_{TxL}$, $V_{TxL}$, $V_{RxH}$ and $V_{RxL}$ may be supplied from the outside.

What is claimed is:

1. A semiconductor device which is capable of being connected to a display panel including a touch sensor comprising:
   a terminal;
   a display driving circuit that drives the display panel;
   a touch detection signal driving circuit that applies a touch detection signal to the touch sensor;
   a touch state detection circuit that receives a signal obtained by observing the touch sensor;
   a connection switching circuit;
   a protection circuit, connected to the terminal, which is capable of changing a protection voltage level; and
   a protection voltage setting circuit which is capable of performing control for changing the protection voltage level,
   wherein the connection switching circuit is capable of switching connection with the terminal by selecting one of at least two of the display driving circuit, the touch detection signal driving circuit and the touch state detection circuit, and
   the protection voltage setting circuit is capable of setting the protection voltage level of the protection circuit in accordance with a signal amplitude of the circuit selected by the connection switching circuit.

2. The semiconductor device according to claim 1, wherein the connection switching circuit includes a level shift circuit which is capable of setting a converted voltage level, and the level shift circuit is capable of setting the converted voltage level in accordance with a signal amplitude to be output by the display driving circuit or the touch detection signal driving circuit which is selected by the connection switching circuit.

3. The semiconductor device according to claim 2, further comprising a power supply circuit, wherein the power supply circuit is a circuit which is capable of generating a first power source based on the signal amplitude to be output by the display driving circuit and a second power source based on the signal amplitude to be output by the touch detection signal driving circuit, from a power source supplied from an outside, the first power source and the second power source are supplied to the protection voltage setting circuit and the level shift circuit, the protection voltage setting circuit is capable of setting the protection voltage level of the protection circuit by selecting any power source from power sources including the first power source and the second power source, in accordance with the signal amplitude of the circuit selected by the connection switching circuit, and the level shift circuit is capable of setting the converted voltage level by selecting any power source from power sources including the first power source and the second power source, in accordance with the signal amplitude to be output by the display driving circuit or the touch detection signal driving circuit which is selected by the connection switching circuit.

4. The semiconductor device according to claim 3, further comprising a reset circuit that outputs an internal reset signal by detecting that a voltage of the power source supplied from the outside exceeds a predetermined potential level, wherein the semiconductor device is configured such that, after the reset circuit outputs the reset signal, a connection switching operation by the connection switching circuit is performed, a setting operation of the protection voltage level by the protection voltage setting circuit is performed, a setting operation of the converted voltage level is performed, and then supply of the first power source and the second power source by the power supply circuit is started.

5. The semiconductor device according to claim 4, further comprising an MPU to which the reset signal is input from the reset circuit, and which is capable of controlling the connection switching operation by the connection switching circuit, the setting operation of the protection voltage level by the protection voltage setting circuit, the setting operation of the converted voltage level, and the start of supply of the first power source and the second power source by the power supply circuit, wherein in case that the reset signal is input, the MPU executes a boot program, to thereby perform the connection switching operation by the connection switching circuit, perform the setting operation of the protection voltage level by the protection voltage setting circuit, perform the setting operation of the converted voltage level, and then start the supply of the first power source and the second power source by the power supply circuit.

6. A semiconductor device which is capable of being connected to a liquid crystal display panel, including a touch sensor to which a touch detection signal is input and which outputs a touch sensing signal, and including a display panel source terminal group to which a voltage to be applied to a liquid crystal is input and a display panel gate terminal group to which a signal for specifying a position of the liquid crystal to be supplied with the voltage is input, the semiconductor device comprising:

a host interface terminal group;

a source output terminal group that outputs a signal for driving the display panel source terminal group;

a first terminal group;

a display panel driving circuit that drives the display panel source terminal group and the display panel gate terminal group on the basis of display data which is input from the host interface terminal group;

a touch detection signal driving circuit that transmits the touch detection signal;

a first connection switching circuit;

a first protection circuit, connected to the first terminal group, which is capable of changing a first protection voltage level; and a protection voltage setting circuit which is capable of performing control for changing the first protection voltage level, wherein the first connection switching circuit includes a level shift circuit which is capable of setting a converted voltage level, and is capable of being connected to the first terminal group by converting a signal amplitude level by the level shift circuit in which the converted voltage level is set, in accordance with a signal amplitude to be output by any one selected out of a circuit that outputs a signal for driving the display panel gate terminal group of the display panel driving circuit and the touch detection signal driving circuit, and the protection voltage setting circuit is capable of setting the first protection voltage level in accordance with the signal amplitude of the circuit selected by the first connection switching circuit.

7. The semiconductor device according to claim 6, wherein the first terminal group is disposed further outside than the source output terminal group, on the same side as a side where the source output terminal group is disposed.

8. The semiconductor device according to claim 6, wherein the first terminal group is disposed further outside than the source output terminal group located on the same side as a side where the source output terminal group is disposed, and is disposed further outside than the host interface terminal group located on an opposite side of the side where the source output terminal group is disposed and on the same side as a side where the host interface terminal group is disposed.

9. The semiconductor device according to claim 6, further comprising:

a second terminal group;

a touch state detection circuit that receives the touch sensing signal;

a second connection switching circuit; and a second protection circuit, connected to the second terminal group, which is capable of changing a second protection voltage level, wherein the second connection switching circuit is capable of switching connection with the second terminal group by selecting one of a circuit that outputs a signal for driving the display panel gate terminal group of the display panel driving circuit, the touch detection signal driving circuit and the touch state detection circuit, and the protection voltage setting circuit is capable of setting the second protection voltage level in accordance with a signal amplitude of the circuit selected by the second connection switching circuit.

10. The semiconductor device according to claim 9, wherein the first terminal group is disposed further outside than the source output terminal group, on the same side as the side where the source output terminal group is disposed, and
the second terminal group is disposed further outside than the source output terminal group and further inside than the first terminal group, on the same side as the side where the source output terminal group is disposed.

11. The semiconductor device according to claim 9, wherein the first terminal group is disposed further outside than the source output terminal group located on the same side as a side where the source output terminal group is disposed, and is disposed further outside than the host interface terminal group located on an opposite side of the side where the source output terminal group is disposed and on the same side as a side where the host interface terminal group is disposed, and
the second terminal group is disposed further outside than the host interface terminal group located on an opposite side of the side where the source output terminal group is disposed and on the same side as the side where the host interface terminal group is disposed.

12. The semiconductor device according to claim 9, wherein the first terminal group is disposed further outside than the source output terminal group located on the same side as a side where the source output terminal group is disposed, and is disposed further outside than the host interface terminal group located on an opposite side of the side where the source output terminal group is disposed and on the same side as a side where the host interface terminal group is disposed, and
the second terminal group is disposed further outside than the source output terminal group and further inside than the first terminal group located on the same side as a side where the source output terminal group is disposed, and is disposed further outside than the host interface terminal group and further inside than the first terminal group located on an opposite side of the side where the source output terminal group is disposed and on the same side as the side where the host interface terminal group is disposed.

13. The semiconductor device according to claim 6, further comprising a power supply circuit,
wherein the power supply circuit is a circuit which is capable of generating a first power source based on the signal amplitude to be output by the display driving circuit and a second power source based on the signal amplitude to be output by the touch detection signal driving circuit, from a power source supplied from an outside,
the first power source and the second power source are supplied to the protection voltage setting circuit and the level shift circuit,
the protection voltage setting circuit is capable of setting the protection voltage level of the protection circuit by selecting any power source from power sources including the first power source and the second power source, in accordance with the signal amplitude of the circuit selected by the connection switching circuit, and
the level shift circuit is capable of setting the converted voltage level by selecting any power source from power sources including the first power source and the second power source, in accordance with the signal amplitude to be output by the display driving circuit or the touch detection signal driving circuit which is selected by the connection switching circuit.

14. The semiconductor device according to claim 13, further comprising a reset circuit that outputs an internal reset signal by detecting that a voltage of the power source supplied from the outside exceeds a predetermined potential level,
wherein the semiconductor device is configured such that, after the reset circuit outputs the reset signal, a connection switching operation by the connection switching circuit is performed, a setting operation of the protection voltage level by the protection voltage setting circuit is performed, a setting operation of the converted voltage level is performed, and then supply of the first power source and the second power source by the power supply circuit is started.

15. The semiconductor device according to claim 14, further comprising an MPU to which the reset signal is input from the reset circuit, and which is capable of controlling the connection switching operation by the connection switching circuit, the setting operation of a protection voltage level by the protection voltage setting circuit, the setting operation of the converted voltage level, and the start of supply of the first power source and the second power source by the power supply circuit,
wherein in case that the reset signal is input, the MPU executes a boot program, to thereby perform the connection switching operation by the connection switching circuit, perform the setting operation of the protection voltage level by the protection voltage setting circuit, perform the setting operation of the converted voltage level, and then start the supply of the first power source and the second power source by the power supply circuit.

* * * * *